United States Patent
Kulkarni et al.

(10) Patent No.: US 10,645,532 B1
(45) Date of Patent: May 5, 2020

(54) PROVIDING NAVIGATION SERVICES USING MULTIPLE ELECTRICAL DEVICES

(71) Applicant: Eaton Intelligent Power Limited, Dublin (IE)

(72) Inventors: Ajinkya Kulkarni, Dhule (IN); Raksha Rao Karaya, Puttur (IN); Aarathi Ramesh, Kozhikode (IN); Pooja Gandhi, Solapur (IN)

(73) Assignee: Eaton Intelligent Power Limited, Dublin (IE)

( * ) Notice: Subject to any disclaimer, the term of this patent is extended or adjusted under 35 U.S.C. 154(b) by 0 days.

(21) Appl. No.: 16/549,532

(22) Filed: Aug. 23, 2019

(51) Int. Cl.
*H04W 4/024* (2018.01)
*H04W 4/80* (2018.01)
*H04W 4/33* (2018.01)

(52) U.S. Cl.
CPC ............. *H04W 4/024* (2018.02); *H04W 4/33* (2018.02); *H04W 4/80* (2018.02)

(58) Field of Classification Search
CPC .... G01C 21/206; H04W 4/024; H04W 4/021; H04W 4/029; H04W 4/02; H04W 4/023; H04W 4/30; H04W 4/33; H04W 4/80
See application file for complete search history.

(56) References Cited

U.S. PATENT DOCUMENTS

| | | | | |
|---|---|---|---|---|
| 2017/0284811 A1* | 10/2017 | Liu | ................. | G06Q 30/0259 |
| 2018/0020333 A1* | 1/2018 | Gillen | ................. | H04W 4/40 |
| 2018/0135991 A1* | 5/2018 | Yang | ................. | H04W 4/02 |

* cited by examiner

*Primary Examiner* — Nam T Huynh
(74) *Attorney, Agent, or Firm* — King & Spalding LLP

(57) ABSTRACT

A system for providing navigation services to a user in a volume of space can include a user device disposed in the volume of space, where the user device broadcasts, at a first time, at least one first communication signal into the volume of space, where the at least one first communication signal includes a first identification of the user and a destination of the user. The system can also include multiple electrical devices disposed in the volume of space, where each electrical device includes a transceiver, where the transceiver of a first subset of the electrical devices receives the at least one first communication signal broadcast by the user device, where the first subset of electrical devices sends a second communication signal based on the at least one first communication signal. The system can further include a controller communicably coupled to the plurality of electrical devices.

20 Claims, 20 Drawing Sheets

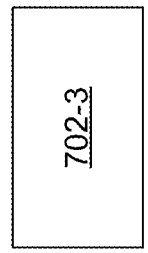
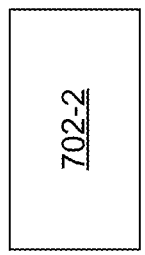
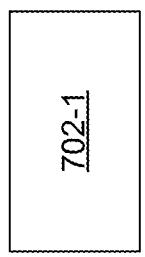
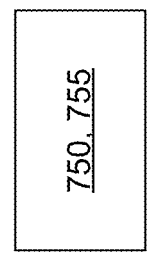
FIG. 7A

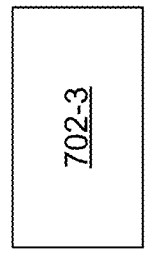
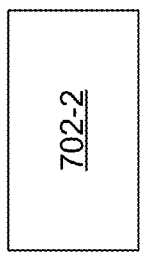
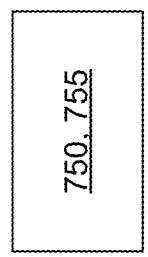
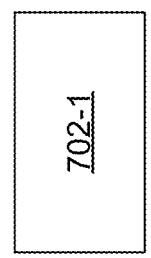
FIG. 7B

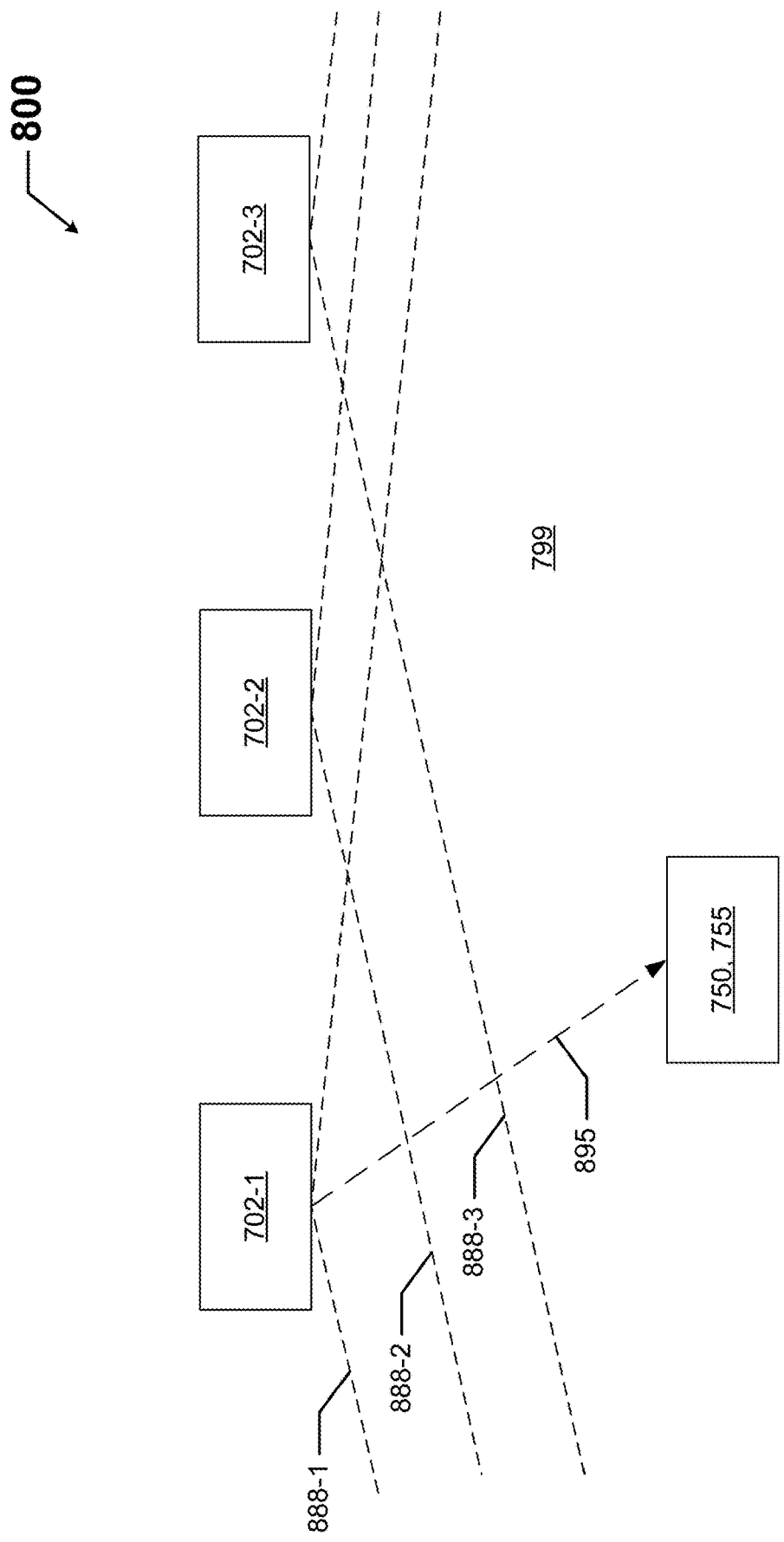

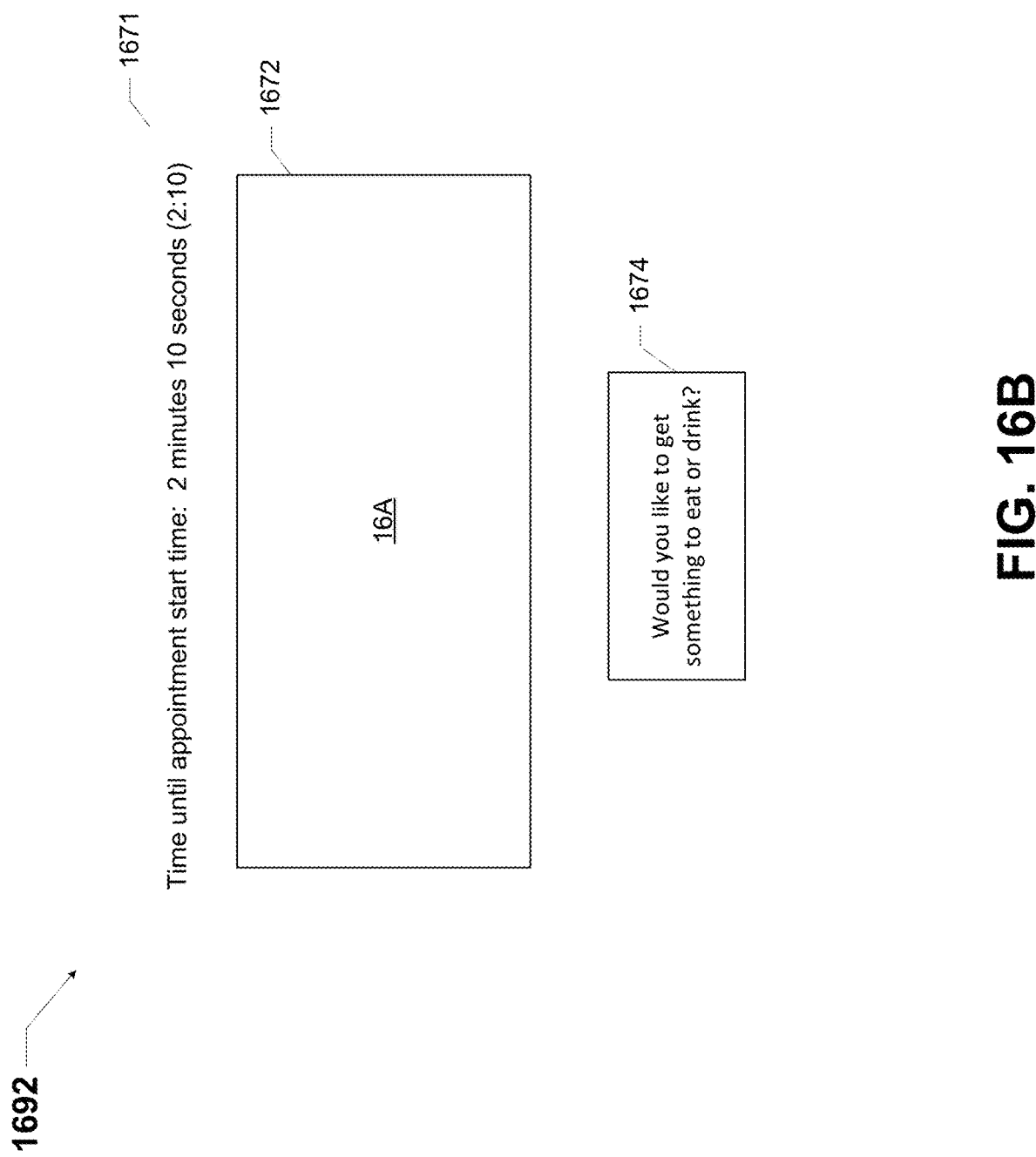

PROVIDING NAVIGATION SERVICES USING MULTIPLE ELECTRICAL DEVICES

TECHNICAL FIELD

Embodiments described herein relate generally to navigation systems, and more particularly to systems, methods, and devices for providing navigation to a user using electrical devices.

BACKGROUND

In large facilities or campuses, or in unfamiliar settings, finding a destination can be difficult. In addition to contending with crowds, signs that may not always be clearly designated, obstacles, and other factors, a destination can change based on factors outside the control of the person trying to reach the destination. In some cases, such as time-sensitive matters, a lack of access to clear navigation information can lead to negative consequences if someone arrives late to a destination.

SUMMARY

In general, in one aspect, the disclosure relates to a system for providing navigation services to a user in a volume of space. The system can include multiple electrical devices disposed in the volume of space, where each electrical device includes a transceiver, where the transceiver of a first subset of electrical devices receives at a first time at least one first communication signal broadcast by a user device of the user, where the at least one first communication signal includes a first identification of the user and a destination of the user, where the first subset of electrical devices sends a second communication signal that includes the first identification and the first destination contained within the at least one first communication signal. The system can also include a controller communicably coupled to the electrical devices. The controller can receive the second communication signal sent by each of the first subset of electrical devices. The controller can also determine the location of the user device in the volume of space using the second communication signal. The controller can further determine the destination of the user using the second communication signal. The controller can also generate at least one navigation path from the location of the user device to the destination in the volume of space. The controller can further select an optimal navigation path from among the at least one navigation path. The controller can also send the optimal navigation path to the user device.

These and other aspects, objects, features, and embodiments will be apparent from the following description and the appended claims.

BRIEF DESCRIPTION OF THE DRAWINGS

The drawings illustrate only example embodiments of providing real-time navigation services using multiple electrical devices. While example embodiments are described herein as using multiple light fixtures, the multiple light fixtures are therefore not to be considered limiting of the scope of the disclosure, as providing real-time navigation services using multiple electrical devices can be applied to other equally effective embodiments. The elements and features shown in the drawings are not necessarily to scale, emphasis instead being placed upon clearly illustrating the principles of the example embodiments. Additionally, certain dimensions or positioning may be exaggerated to help visually convey such principles. In the drawings, reference numerals designate like or corresponding, but not necessarily identical, elements.

FIGS. 7A and 7B show a side and top view, respectively, of a system in which a user device is located in a volume of space in accordance with certain example embodiments.

FIG. 8 shows the system of FIGS. 7A and 7B when a signal is sent by one of the light fixtures in accordance with certain example embodiments.

DETAILED DESCRIPTION OF EXAMPLE EMBODIMENTS

Figure 1:
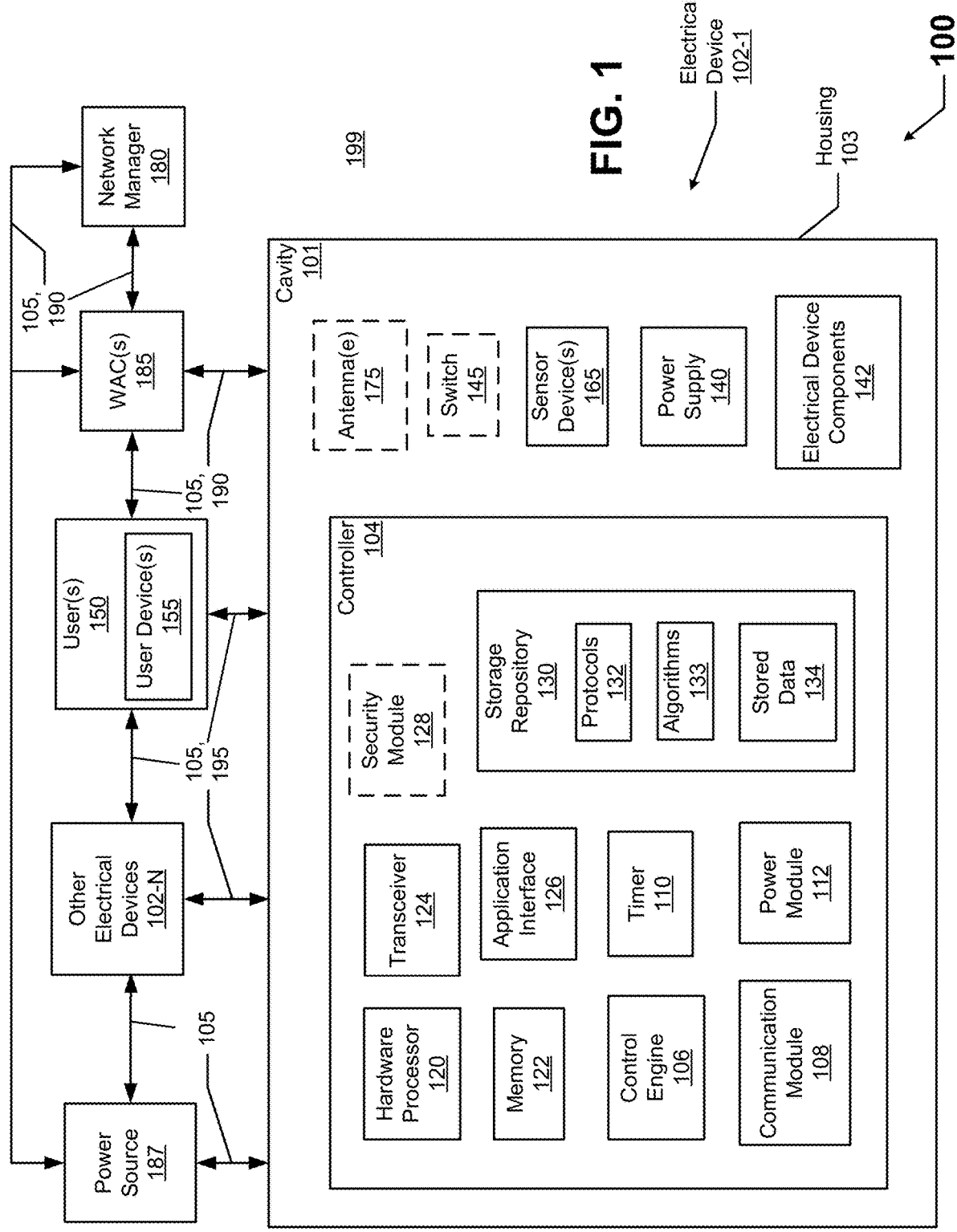
FIG. 1 shows a diagram of a system in accordance with certain example embodiments.

The example embodiments discussed herein are directed to systems, methods, and devices for providing real-time navigation services using multiple electrical devices. While example embodiments are described herein as using multiple light fixtures (or components thereof) to locate an object in a volume of space, example embodiments can use one or more of a number of other electrical devices in addition to, or as an alternative to, light fixtures. Such other electrical devices can include, but are not limited to, a light switch, a control panel, a thermostat, an electrical wall outlet, a sensor device (e.g., a smoke detector, a $CO_2$ monitor, a motion detector, a broken glass sensor, an integrated sensor device (defined below)), an electrical sign, a digital display board, and a camera.

Further, any of a number of location methods can be used with example embodiments to locate one or more objects in real-time (using real-time location services (RTLS)). Examples of such location methods can include, but are not limited to, time-of-flight (ToF), angle of arrival (AoA), and angle of departure (AoD). Any of these methods can involve measurements of one or more other parameters with respect to signals aside from signal strength. Examples of such other parameters can include, but are not limited to, distance of travel, angle, and time of travel.

Example embodiments can be used for a volume of space having any size and/or located in any environment (e.g., indoor, outdoor, trade show, convention facility, warehouse, residential, office space, factory, industrial, estate grounds, museum, school campus, airport, train station, parking lot, parking garage). Further, while signals described herein are radio frequency (RF) signals, example embodiments can be used with any of a number of other types of signals and/or platform, including but not limited to visible light signals, LiFi, WiFi, Bluetooth, Bluetooth Low Energy (BLE), RFID, ultraviolet waves, microwaves, and infrared signals. For example, RF signals transmitted using BLE are sent and received at approximately 2.4 GHz. Example embodiments can be used to provide navigation services in real time.

When an electrical device in an example system is a light fixture (also called a luminaire), the light fixture can be any of a number of types of light fixtures, including but not limited to a troffer fixture, a pendant light fixture, a floodlight, a spotlight, an emergency egress fixture, an exit sign, a down can light fixture, and a high bay light fixture. Regardless of the type of light fixture, such a light fixture can use one or more of a number of different types of light sources, including but not limited to light-emitting diode (LED) light sources, fluorescent light sources, organic LED light sources, incandescent light sources, and halogen light sources. Therefore, light fixtures described herein, even in hazardous locations, should not be considered limited to a particular type of light source.

Example embodiments can use various methods to provide navigation services in a volume of space in an efficient manner that uses relatively little bandwidth. Example embodiments can be used to provide navigation services in real time in two dimensions (e.g., on a single floor of a building) or in three dimensions (e.g., multiple floors in a building) using RTLS structures in combination with navigation services. In addition, example embodiments, provide a high level of data security if such security is desired by a user. Example embodiments can be reliable and use low amounts of power and bandwidth. Example embodiments can be installed with new electrical (e.g., lighting, security, entertainment, HVAC) systems. Alternatively, example embodiments can be programmed into existing electrical systems and related equipment with little to no need to add or modify existing hardware.

In certain example embodiments, electrical devices (e.g., light fixtures) used for providing navigation services can be subject to meeting certain standards and/or requirements. For example, the National Electric Code (NEC), the National Electrical Manufacturers Association (NEMA), the International Electrotechnical Commission (IEC), the Federal Communication Commission (FCC), and the Institute of Electrical and Electronics Engineers (IEEE) set standards as to electrical enclosures (e.g., light fixtures), wiring, and electrical connections. Use of example embodiments described herein meet (and/or allow a corresponding device to meet) such standards when required. In some (e.g., PV solar) applications, additional standards particular to that application may be met by the electrical enclosures described herein.

If a component of a figure is described but not expressly shown or labeled in that figure, the label used for a corresponding component in another figure can be inferred to that component. Conversely, if a component in a figure is labeled but not described, the description for such component can be substantially the same as the description for the corresponding component in another figure. The numbering scheme for the various components in the figures herein is such that each component is a three-digit number or a four-digit number, and corresponding components in other figures have the identical last two digits. For any figure shown and described herein, one or more of the components may be omitted, added, repeated, and/or substituted. Accordingly, embodiments shown in a particular figure should not be considered limited to the specific arrangements of components shown in such figure.

Further, a statement that a particular embodiment (e.g., as shown in a figure herein) does not have a particular feature or component does not mean, unless expressly stated, that such embodiment is not capable of having such feature or component. For example, for purposes of present or future claims herein, a feature or component that is described as not being included in an example embodiment shown in one or more particular drawings is capable of being included in one or more claims that correspond to such one or more particular drawings herein.

Example embodiments of providing real-time navigation services using multiple electrical devices will be described more fully hereinafter with reference to the accompanying drawings, in which example embodiments of providing real-time navigation services using multiple electrical devices are shown. Providing real-time navigation services using multiple electrical devices may, however, be embodied in many different forms and should not be construed as limited to the example embodiments set forth herein. Rather, these example embodiments are provided so that this disclosure will be thorough and complete, and will fully convey the scope of providing real-time navigation services using multiple electrical devices to those or ordinary skill in the art. Like, but not necessarily the same, elements (also sometimes called components) in the various figures are denoted by like reference numerals for consistency.

Terms such as "first", "second", and "within" are used merely to distinguish one component (or part of a component or state of a component) from another. Such terms are not meant to denote a preference or a particular orientation, and such terms are not meant to limit embodiments of providing real-time navigation services using multiple electrical devices. In the following detailed description of the example embodiments, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

FIG. 1 shows a diagram of a system 100 that includes multiple electrical devices 102 and one or more users 150 (with one or more associated user devices 155) in a volume of space 199 in accordance with certain example embodiments. The system 100 can also include a user 150, a network manager 180, a power source 187, and one or more wireless access controllers 185 (WACs 185). Each electrical device 102 (e.g., electrical device 102-1) can include a controller 104, one or more sensor devices 165, one or more optional antennae 175, an optional switch 145, a power supply 140, and a number of electrical device components 142. The controller 104 can include one or more of a number of components. Such components, can include, but are not limited to, a control engine 106, a communication module 108, a timer 110, a power module 112, a storage repository 130, a hardware processor 120, a memory 122, a transceiver 124, an application interface 126, and, optionally, a security module 128.

The components shown in FIG. 1 are not exhaustive, and in some embodiments, one or more of the components shown in FIG. 1 may not be included in an example electrical device 102. Any component of the example electrical device 102 can be discrete or combined with one or more other components of the electrical device 102. For example, each electrical device 102 in the system 100 can have its own controller 104. Alternatively, one controller 104 can be used to control multiple electrical devices 102 in the system. An electrical device 102 is any device that uses electricity, at least in part, to operate. A list of some potential electrical devices 102 is described above.

A user 150 may be any person that interacts with one or more of the electrical devices 102 in the volume of space 199. Specifically, a user 150 may program, operate, and/or interface with one or more components (e.g., a controller, a network manager) associated with the system 100 using example embodiments. Examples of a user 150 can include, but are not limited to, an employee, a traveler, a visitor, an employee, an engineer, an electrician, a technician, an operator, a consultant, a contractor, an asset, a network manager, and a manufacturer's representative.

A user 150 can use one or more user systems 155 (sometimes also called user devices 155 herein), which may include a display (e.g., a GUI). A user 150 (including a user system 155) interacts with (e.g., sends data to, receives data from) the controller 104 of an electrical device 102 via the application interface 126 (described below). A user 150 (including a user system 155) can also interact with a network manager 180 and/or the sensor devices 165. Interaction (including transmission of communication signals 195) between a user 150 (including a user system 155) and the electrical device 102, the network manager 180, and the sensor devices 165 can be facilitated using communication links 105.

A user device 155 of a user 150 can move on its own, is capable of being moved, or is stationary. Examples of a user device 155 can include, but are not limited to, an interactive identification badge, a smart phone, a tablet, an audio device (as for self-guided tours), and smart glasses. A user device 155 can include one or more components (e.g., a controller (including a control engine, a transceiver, a communication module, a timer, a storage repository), antenna, switch, a power supply) that are included in the electrical device 102-1 (or portions thereof). For example, a user device 155 can include a control engine, a transceiver, and an antenna to allow the user device 155 to send communication signals 195 to and/or receive communication signals 195 from one or more electrical devices 102 in the system 100. In some cases, a user device 155 can have loaded thereon a navigation services application, controlled by a controller of the user device 155, to help provide real time navigation services described herein. A system 100 can have one user device 155 or multiple user devices 155 in the volume of space 199.

A user device 155 can broadcast communication signals 195 that can be received by any electrical devices 102 within range of the broadcast or send communication signals 195 addressed to one or more particular electrical devices 102. Examples of a communication signal 195 can include, but are not limited to, RF signals, visible light communication (VLC) signals, and analog signals. A user device 155 can initiate a communication signal 195 and/or generate a communication signal 195 based on a previously-received communication signal 195 from one or more electrical devices 102. In some cases, a communication signal 195 or series of communication signals 195 sent by a user device 155 can include a universal unique identifier (UUID) (or other form of identification) associated with the user device 155 and/or the user 150 operating the user device 155. Similarly, a communication signal 195 received by the user device 155 can include a UUID (or some other form of identification) associated with the one or more electrical devices 102 that sent the communication signals 195. For location purposes, a user device 155 can be considered a beacon.

In addition, or in the alternative, a communication signal 195 or series of communication signals 195 sent by a user device 155 (e.g., to one or more electrical devices 102, to a WAC 185, to the network manager 180) can include a destination within the volume of space 199 at which the user 150 wants to arrive. In some cases, a communication signal 195 or series of communication signals 195 sent by a user device 155 can be used both for determining the location of the user device 155 in the volume of space 199 and for establishing the destination of travel by the user 150. Alternatively, one communication signal 195 or series of communication signals 195 sent by a user device 155 can be used to determine the location of the user device 155 in the volume of space 199, while another communication signal 195 or series of communication signals 195 sent by a user device 155 can be used to establish the destination of travel by the user 150.

Using example embodiments, the user device 155 (including an application thereon) of a user 150 can be in sleep mode until the user 150 activates the user device 155 (or application thereof). Once the user device 155 (or application thereon) is activated, the user device 155 can broadcast a communication signal 195. The user device 155 (or application thereof) then stays active throughout the navigation process. During the navigation process, the user device 155 receives communication signals 195 from one or more of the electrical devices 102 and sends communication signals 195 to one or more of the electrical devices 102.

A user device 155 can use one or more of a number of communication protocols (e.g., types of protocols 132) in sending communication signals 195 to and/or receiving communication signals 195 from the electrical devices 102. In certain example embodiments, a user device 155 can include a battery (a form of power supply or power module) that is used to provide power, at least in part, to some or all of the rest of the user device 155. In certain example embodiments, a user device 155 can include multiple antennae and a corresponding switch, where an antenna is substantially the same as an antenna 175 described below with respect to the electrical device 102-1, and the optional switch is substantially the same as the optional switch 145 described below with respect to the electrical device 102-1. Alternatively, a user device 155 of a user 150 can include a single antenna or have no antenna.

Each communication link 105 can include wired (e.g., Class 1 electrical cables, Class 2 electrical cables, electrical connectors) and/or wireless (e.g., Wi-Fi, visible light communication, cellular networking, Bluetooth, Bluetooth Low Energy (BLE), Zigbee, WirelessHART, ISA100, Power Line Carrier, RS485, DALI) technology. For example, a communication link 105 can be (or include) one or more electrical conductors that are coupled to the housing 103 of an electrical device 102 and to the network manager 180. The communication links 105 can transmit signals (e.g., power signals, communication signals 195, control signals, data) between the electrical devices 102, a user 150 (including a user system 155), the sensor devices 165, the WACs 185, and/or the network manager 180. For example, the electrical devices 102 of the system 100 can interact with one or more user systems 155 by transmitting communication signals 195 over one or more communication links 105, as discussed below. The signals transmitted over the communication links 105 are made up of bits of data.

The power source 187 of the system 100 provides AC mains or some other form of power to one or more components (e.g., electrical device 102-1, the other electrical devices 102-N, the WACs 185) within the system 100. The power source 187 can include one or more of a number of components. Examples of such components can include, but are not limited to, an electrical conductor, a coupling feature (e.g., an electrical connector), a transformer, an inductor, a resistor, a capacitor, a diode, a transistor, and a fuse. The power source 187 can be, or include, for example, a wall outlet, an energy storage device (e.g. a battery, a supercapacitor), a circuit breaker, and/or an independent source of generation (e.g., a photovoltaic solar generation system). The power source 187 can also include one or more components (e.g., a switch, a relay, a controller) that allow the power source 187 to communicate with and/or follow instructions from, for example, the controller 104 and/or the network manager 180.

The network manager 180 is a device or component that controls all or a portion of the system 100 that includes the controller 104 of at least one of the electrical devices 102 and the WACs 185. The network manager 180 can be substantially similar to the controller 104 and/or a WAC 185. Alternatively, the network manager 180 can include one or more of a number of features in addition to, or altered from, the features of the controller 104 and/or a WAC 185, both described below. There can be more than one network manager 180 and/or one or more portions of a network manager 180.

In some cases, a network manager 180 can be called an insight manager, a RTLS engine, or any of a number of other names used in the industry. In such a case, the network manager 180 receives data from the WACs 185 and processes this data (e.g., using algorithms 133 and/or protocols 132) to provide navigation services in real time. The network manager 180 can be located in the volume of space 199 or remotely from the volume of space 199. The network manager 180 can use the various communications received from the WACs 185 and/or the electrical devices 102 to provide navigation services to a user device 155 in two dimensions or in three dimensions within the volume of space 199.

Each WAC 185 (sometimes more simply called an access controller, as a generic term and/or when wired communication links 105 are involved) performs a number of different functions. For example, a WAC 185 can help communicate with and control the controller 104 of one or more electrical devices 102 to help control the operation of those electrical devices 102. For RTLS applications, the WAC 185 can be responsible for pairing with the Zigbee-enabled sensor devices 165, providing configuration data to the sensor devices 165, synchronizing the timing of those sensor devices 165, supporting the firmware of those sensor devices 165, upgrading those sensor devices 165, receiving location/telemetry data (e.g., using a Zigbee-enabled communication links 105) from the sensor devices 165, and/or performing any other function with respect to those sensor devices 165 to support RTLS activities.

When a WAC 185 receives data (e.g., packed egress data that arrives as ingress data) from a sensor device 165, the WAC 185 can convert the data into a different format (e.g., ECAPI). The WAC 185 can then send the newly-formatted data to the network manager 180. To help diagnose issues, a WAC 185 can maintain counters for each paired sensor device 165 and include, for example, the number of received packed data messages from a particular sensor device 165, the number of formatted messages successfully transmitted to the network manager 180 that pertain to the packed data from a particular sensor device 165, and the number of formatted messages pertaining to the packed data from a particular sensor device 165 that failed to transmit to the network manager 180.

In some cases, a WAC 185 maintains the average and maximum latency introduced between the receipt of a message from a sensor device 165 and transmission of a formatted message to the network manager 180. The WAC 185 can also notify the network manager 180 when the average or maximum latency exceeds a threshold value. Further, a WAC 185 can communicate to the network manager 180 when there is a significant discrepancy (e.g., as determined by the WAC 185) between the ingress and egress packets with respect to a sensor device 165. When there are multiple WACs 185, they can all be time-synchronized with each other. In some cases, the functionality of a WAC 185 can be the same as, or at least partially combined with, the functionality of the controller 104 of an electrical device 102. A WAC 185 can be located in the volume of space 199 or remotely from the volume of space 199.

The users 150 (including associated user systems 155), the network manager 180, one or more sensor devices 165, the power source 187, one or more WACs 185, and/or the other electrical devices 102-N can interact with the controller 104 of the electrical device 102-1 using the application interface 126 in accordance with one or more example embodiments. Specifically, the application interface 126 of the controller 104 receives data (e.g., information, communications, instructions, communication signals 195) from and sends data (e.g., information, communications, instructions, communication signals 195) to a user 150 (including a user system 155), the network manager 180, the sensor devices 165, the power source 187, one or more WACs 185, and/or one or more of the other electrical devices 102-N.

A user 150 (including a user system 155), the network manager 180, the sensor devices 165, the power source 187, one or more WACs 185, and/or one or more of the other electrical devices 102-N can include an interface to receive data from and send data to the controller 104 in certain example embodiments. Examples of such an interface can include, but are not limited to, a graphical user interface, a touchscreen, an application programming interface, a keyboard, a monitor, a mouse, a web service, a data protocol adapter, some other hardware and/or software, or any suitable combination thereof.

The controller 104, the users 150 (including associated user systems 155), the network manager 180, the sensor devices 165, the power source 187, one or more WACs 185, and/or one or more of the other electrical devices 102-N can use their own system or share a system in certain example embodiments. Such a system can be, or contain a form of, an Internet-based or an intranet-based computer system that is capable of communicating with various software. A computer system includes any type of computing device and/or communication device, including but not limited to the controller 104. Examples of such a system can include, but are not limited to, a desktop computer with a Local Area Network (LAN), a Wide Area Network (WAN), Internet or intranet access, a laptop computer with LAN, WAN, Internet or intranet access, a smart phone, a server, a server farm, an android device (or equivalent), a tablet, smartphones, and a personal digital assistant (PDA). Such a system can correspond to a computer system as described below with regard to FIG. 2.

Further, as discussed above, such a system can have corresponding software (e.g., user software, controller software, network manager software). The software can execute on the same or a separate device (e.g., a server, mainframe, desktop personal computer (PC), laptop, PDA, television, cable box, satellite box, kiosk, telephone, mobile phone, or other computing devices) and can be coupled by the communication network (e.g., Internet, Intranet, Extranet, LAN, WAN, or other network communication methods) and/or communication channels, with wire and/or wireless segments according to some example embodiments. The software of one system can be a part of, or operate separately but in conjunction with, the software of another system within the system 100.

The electrical device 102-1 can include a housing 103. The housing 103 can include at least one wall that forms a cavity 101. In some cases, the housing 103 can be designed to comply with any applicable standards so that the electrical device 102-1 can be located in a particular environment (e.g., a hazardous environment) within the volume of space 199.

The housing 103 of the electrical device 102-1 can be used to house one or more components of the electrical device 102-1, including one or more components of the controller 104. For example, as shown in FIG. 1, the controller 104 (which in this case includes the control engine 106, the communication module 108, the timer 110, the power module 112, the storage repository 130, the hardware processor 120, the memory 122, the transceiver 124, the application interface 126, and the optional security module 128), the one or more sensor devices 165, an optional switch 145, one or more optional antennae 175, the power supply 140, and the electrical device components 142 are disposed in the cavity 101 formed by the housing 103. In alternative embodiments, any one or more of these or other components of the electrical device 102-1 can be disposed on the housing 103 and/or remotely from the housing 103.

The storage repository 130 can be a persistent storage device (or set of devices) that stores software and data used to assist the controller 104 in communicating with the users 150 (including associated user systems 155), the network manager 180, the sensor devices 165, one or more WACs 185, and one or more of the other electrical devices 102-N within the system 100. In one or more example embodiments, the storage repository 130 stores one or more protocols 132, one or more algorithms, 133, and stored data 134.

The protocols 132 can be any procedures (e.g., a series of method steps) and/or other similar operational procedures that the control engine 106 of the controller 104 follows based on certain conditions at a point in time. The protocols 132 can also include any of a number of communication protocols that are used to send and/or receive data between the controller 104 and the users 150 (including associated user systems 155), the power source 187, the network manager 180, the one or more of the other electrical devices 102-N, the sensor devices 165, and one or more WACs 185. One or more of the protocols 132 used for communication can be a time-synchronized protocol. Examples of such time-synchronized protocols can include, but are not limited to, a highway addressable remote transducer (HART) protocol, a wirelessHART protocol, and an International Society of Automation (ISA) 100 protocol. In this way, one or more of the protocols 132 used for communication can provide a layer of security to the data transferred within the system 100.

A protocol 132 can instruct the control engine 106 to direct the transceiver 124, the network manager 180, the sensor devices 165, one or more WACs 185, and/or one or more of the other electrical devices 102-N to maintain communication with a user 150 (including an associated user device 155) while navigation services are provided. Further, a protocol 132 can instruct the control engine 106 to have the transceiver 124, the network manager 180, the sensor devices 165, one or more WACs 185, and/or one or more of the other electrical devices 102-N to immediately notify the control engine 106 when navigation services are no longer provided. In such a case, the control engine 106 can follow one or more protocols 132 to instruct the timer 110 to stop counting time and report to the control engine 106 the clock time and/or the amount of time navigation services are being provided.

Such protocols 132 can be for a particular user 150 or associated user device 155, a particular group of users 150 or associated user devices 155, or for all known users 150 or associated user devices 155. A protocol 132 can be adjusted at different points in time. Such adjustments can be made, for example, by a user 150, by the network manager 180, and/or automatically by the control engine 106 based on historical data.

The algorithms 133 can be any formulas, mathematical models, forecasts, simulations, and/or other similar tools that the control engine 106 of the controller 104 uses to reach a computational conclusion. An example of one or more algorithms 133 is calculating the strength of a communication signal 195 and comparing the strength of a communication signal 195 with a threshold value. Another example of one or more algorithms 133 determining, using the known position of a user device 155, an optimal path for a user 150 to follow within the volume of space 199 to reach a destination within the volume of space 199. Algorithms 133 can be used to analyze past data, analyze current data, and/or perform forecasts.

One or more particular algorithms 133 can be used in conjunction with one or more particular protocols 132. For example, one or more protocols 132 and one or more algorithms 133 can be used in conjunction with each other to track the location of a user device 155 in a volume of space 199 in real time. As another example, one or more protocols 132 and one or more algorithms 133 can be used in conjunction with each other to track a user device 155 using encoded IR signaling (a type of communication signal 195), which can involve one or more sensor devices 165 and/or one or more electrical devices 102. As still another example, one or more protocols 132 and one or more algorithms 133 can be used in conjunction with each other to track a user device 155 based on a temporal separation of one or more electrical devices 102 based on a received signal strength indicator (RSSI).

As another example, one or more protocols 132 and one or more algorithms 133 can be used to instruct the control engine 106 to direct the transceiver 124, one or more other electrical devices 102-N, the WACs 185, the network manager 180, and/or one or more sensors 165 to maintain communication with the user 150 (including an associated user device 155) while navigation services are provided. Further, one or more protocols 132 and one or more algorithms 133 can be used to instruct the control engine 106 to have the transceiver 124, one or more other electrical devices 102-N, the WACs 185, the network manager 180, and/or one or more sensors 165 to immediately notify the control engine 106 when navigation services are no longer provided. In such a case, the control engine 106 can follow one or more protocols 132 to instruct the timer 110 to stop counting time and report to the control engine 106 the clock time and/or the amount of time navigation services are being provided.

Stored data 134 can be any data associated with the system 100 (including any components thereof), time measured by the timer 110, adjustments to an algorithm 133, threshold values, user preferences, default values, IDs of users 150 and/or user devices 155, IDs of one or more of the electrical devices 102, results of previously run or calculated algorithms 133, and/or any other suitable data. Such data can be any type of data, including but not limited to historical data for the system 100 (including any components thereof, such as the timer 110), present data, and/or future data (e.g., forecasts). The stored data 134 can be associated with some measurement of time derived, for example, from the timer 110.

Examples of a storage repository 130 can include, but are not limited to, a database (or a number of databases), a file system, a hard drive, flash memory, a cloud-based storage system, some other form of solid state data storage, or any suitable combination thereof. The storage repository 130 can be located on multiple physical machines, each storing all or a portion of the protocols 132, the algorithms 133, and/or the stored data 134 according to some example embodiments. Each storage unit or device can be physically located in the same or in a different geographic location.

The storage repository 130 can be operatively connected to the control engine 106. In one or more example embodiments, the control engine 106 includes functionality to communicate with the users 150 (including associated user systems 155), the network manager 180, the power source 187, the sensor devices 165, one or more WACs 185, and the other electrical devices 102-N in the system 100. More specifically, the control engine 106 sends information to and/or receives information from the storage repository 130 in order to communicate with a user 150 (including a user system 155), the network manager 180, the power source 187, the sensor devices 165, one or more WACs 185, and the other electrical devices 102-N. As discussed below, the storage repository 130 can also be operatively connected to the communication module 108 in certain example embodiments.

In certain example embodiments, the control engine 106 of the controller 104 controls the operation of one or more components (e.g., the communication module 108, the timer 110, the transceiver 124) of the controller 104. For example, the control engine 106 can put the communication module 108 in "sleep" mode when there are no communications between the controller 104 and another component (e.g., a sensor device 165, the power source 187, a WAC 185, a user system 155) in the system 100 or when communications between the controller 104 and another component in the system 100 follow a regular pattern. In such a case, power consumed by the controller 104 is conserved by only enabling the communication module 108 when the communication module 108 is needed.

As another example, the control engine 106 can direct the timer 110 when to provide a current time, to begin tracking a time period, and/or perform another function within the capability of the timer 110. As yet another example, the control engine 106 can direct the transceiver 124 to send communication signals 195 (or other types of communication) and/or stop sending communication signals 195 (or other types of communication) to one or more sensor devices 165, one or more of the electrical devices 102, and/or one or more WACs 185 in the system 100. The control engine 106 can also instruct a sensor device 165 and/or an electrical device 102 to communicate with a user device 155. This example provides another instance where the control engine 106 can conserve power used by the controller 104 and other components (e.g., a user device 155, the sensor devices 165) of the system 100.

The control engine 106 can determine when to broadcast one or more communication signals 195 in an attempt to locate a user device 155. To conserve energy, the control engine 106 does not constantly broadcast communication signals 195, but rather only does so at discrete times. The control engine 106 can broadcast a communication signal 195 based on one or more of a number of factors, including but not limited to passage of time, the occurrence of an event, instructions from a user 150 (including a user system 155), and a command received from the network manager 180. The control engine 106 can coordinate with the controllers 104 of one or more of the other electrical devices 102-N and/or directly control one or more of the other electrical devices 102-N to broadcast multiple communication signals 195. The control engine 106 can also determine the signal strength (e.g., RSSI) of one or more of the communication signals 195 that are broadcast by a user device 155, in some cases in response to the communication signal 195 broadcast by the electrical device 102-1.

In some cases, the control engine 106 of the electrical device 102-1 (or, in some cases, the network manager 180 or WAC 185 communicating with the controller 104) can locate a user device 155 based on the multiple communication signals 195 sent by the user device 155, in some cases in response to the multiple communication signals 195 broadcast by the electrical devices 102. To accomplish this, the control engine 106 obtains the multiple communication signals 195 (directly and/or from another control engine 106 from one or more of the other electrical devices 102-N) broadcast by the user device 155 and uses one or more protocols 132 and/or algorithms 133 to determine the location of the user device 155 in the volume of space 199 in real time.

The control engine 106 of the controller 104 can also use the protocols 132 and/or the algorithms 133 to extract the ID of a user device 155 from a communication signal 195 received from the user device 155 directly by the transceiver 124 or by an integrated sensor device 165. The control engine 106 of the controller 104 can also use the storage repository 130, the protocols 132, and/or the algorithms 133 to determine if the ID of the user device 155 is part of a list of IDs. Such a list can be used to determine whether subsequent communication generated by the control engine 106 is sent to a WAC 185 and/or the network manager to provide navigation services.

The control engine 106 of the controller 104 can further use the protocols 132 and/or the algorithms 133 to interpret the measurements made by one or more of the sensors of an integrated sensor module 165. The control engine 106 of the controller 104 can also use the protocols 132 and/or the algorithms 133 to generate a subsequent communication signal 195 to a WAC 185 that is based on receipt of the first communication signal 195. For example, a subsequent communication signal 195 can include a number of bits that are directed to information such as, for example, the ID of a user device 155, the ID of the sensor device 165, and the RSSI of the communication signal 195 received by the sensor device 165.

In some cases, the control engine 106 of the controller 104 can further use the protocols 132 and/or the algorithms 133 to map an optimal path and one or more alternative paths for a user 150 to reach a destination, designated by the user 150, within the volume of space 199. Further, the control engine 106 of the controller 104 can further use the protocols 132 and/or the algorithms 133 to alter the optimal path and/or alternative paths as the user 150 moves based on any of a number of factors, including but not limited to the current path of the user 150, sudden obstacles in a path, an emergency within the volume of space 199, current traffic along one or more of the paths, and a target time by which the user 150 must reach the destination.

In certain example embodiments, the control engine 106 of the controller 104 can further use the protocols 132 and/or the algorithms 133 to communicate to a user 150, through an associated user device 155, an amount of time remaining before the user 150 must reach the destination. In some cases, the control engine 106 of the controller 104 can further use the protocols 132 and/or the algorithms 133 to notify the user 150, through an associated user device 155, potential features of interest to the user 150 along a path leading to the destination with in the volume of space 199.

When the control engine 106 generates a potential navigation path, the control engine 106 can use one or more algorithms 133 and/or protocols 132 to identify obstacles (e.g., walls, columns, furniture, machines) that exist in the volume of space 199 and ensure that the navigation path does not cross over any of those obstacles. The control engine 106 can similarly use one or more algorithms 133 and/or protocols 132 to identify stairwells, doorways, elevators, fire escapes, and other similar elements in the volume of space 199 and factor whether those elements pose a problem for a user 150 trying to reach a destination. For example, if the user is wheelchair bound and is traveling without a companion, then the control engine 106 can identify doorways that are not handicap accessible and escalators, and then subsequently eliminate potential navigation paths that include those elements from consideration. Some of this information about these obstacles and/or elements in the volume of space 199 can be provided by a third party (e.g., a facility manager for the volume of space 199, input from prior users 150).

For enhanced security, in some cases, the control engine 106 of the controller 104 can use the protocols 132 and/or the algorithms 133 to generate tables that provide coded IDs for one or more electrical devices 102 and use these coded IDs when sending and receiving communication signals 195. In this way, if a third party intercepts one or more of the communication signals 195, the true ID (e.g., the MAC address) of the electrical devices 102 cannot be used at a later time to improperly control the electrical devices 102. For example, if the volume of space 199 is an airport or some other facility with heightened security, each electrical device 102 in the form of a light fixture can be identified in communication signals 195 with coordinates such as (PseudoID, ZoneID, FloorID, DestID). By using a pseudoID, people trying to hack the system are unable to establish the actual MAC address of the electrical device 102, which prevents the hacker from being able to control or otherwise infiltrate the electrical device 102.

In certain example embodiments, the control engine 106 of the controller 104 can further use the protocols 132 and/or the algorithms 133 to communicate with and retrieve information from a third-party system. Such information can be used by the control engine 106 to determine a destination of a user 150 in the volume of space 199, determine one or more obstacles along a navigation path presented to a user 150 on a user device 155, and/or for any other purpose related to providing real time navigation services. Examples of such a third party system can include, but are not limited to, an airline company (e.g., to determine a gate at which a flight ticketed to a user 150 is located), an arena management company (e.g., to determine a seat assigned to a user 150), a bus operating company, a train operating company, and a university (e.g., to determine where a class for a user 150 who is a student is located).

As a specific example, a user 150 can use a user device 155 to scan a code (e.g., a passenger name record (PNR) code on an airline ticket). An app associated with example real-time navigation services can send the code to an airline company or airport operator to determine the gate at the airport (a volume of space 199) out of which the user 150 is departing. The control engine 106 can then generate an optimal navigation path for the user 150 to arrive at the gate, and present the navigation path to the user 150 on the user device 155.

The control engine 106 can provide control, communication, and/or other similar signals to a user 150 (including an associated user system 155), the network manager 180, the other electrical devices 102-N, the sensor devices 165, one or more WACs 185, and the power source 187. Similarly, the control engine 106 can receive control, communication, and/or other similar signals from a user 150 (including an associated user system 155), the network manager 180, the other electrical devices 102-N, the sensor devices 165, one or more WACs 185, and the power source 187. The control engine 106 can communicate with each user system 155 automatically (for example, based on one or more algorithms 133 stored in the storage repository 130) and/or based on control, communication, and/or other similar signals received from another device (e.g., the network manager 180, the electrical device 102-1) using the communication signals 195. The control engine 106 may include a printed circuit board, upon which the hardware processor 120 and/or one or more discrete components of the controller 104 are positioned.

In certain example embodiments, the control engine 106 can include an interface that enables the control engine 106 to communicate with one or more components (e.g., power supply 140) of the electrical device 102-1. For example, if the power supply 140 of the electrical device 102-1 operates under IEC Standard 62386, then the power supply 140 can include a digital addressable lighting interface (DALI). In such a case, the control engine 106 can also include a DALI to enable communication with the power supply 140 within the electrical device 102-1. Such an interface can operate in conjunction with, or independently of, the communication protocols 132 used to communicate between the controller 104 and a user 150 (including an associated user system 155), the network manager 180, the other electrical devices 102-N, the sensor devices 165, one or more WACs 185, and the the power source 187.

The control engine 106 (or other components of the controller 104) can also include one or more hardware and/or software architecture components to perform its functions. Such components can include, but are not limited to, a universal asynchronous receiver/transmitter (UART), a serial peripheral interface (SPI), a direct-attached capacity (DAC) storage device, an analog-to-digital converter, an inter-integrated circuit ($I^2C$), and a pulse width modulator (PWM).

By using example embodiments, while at least a portion (e.g., the control engine 106, the timer 110) of the controller 104 is always on, the remainder of the controller 104 can be in sleep mode when they are not being used. In addition, the controller 104 can control certain aspects (e.g., sending communication signals 195 to and receiving communication signals 195 from a user device 155) of one or more other electrical devices 102-N in the system 100.

The communication network (using the communication links 105) of the system 100 can have any type of network architecture. For example, the communication network of the system 100 can be a mesh network. As another example, the communication network of the system 100 can be a star network. When the controller 104 includes an energy storage device (e.g., a battery as part of the power module 112), even more power can be conserved in the operation of the system 100. In addition, using time-synchronized communication protocols 132, the data transferred between the controller 104 and a user 150 (including an associated user system 155), the network manager 180, the sensor devices 165, one or more WACs 185, the power source 187, and the other electrical devices 102-N can be secure.

The communication module 108 of the controller 104 determines and implements the communication protocol (e.g., from the protocols 132 of the storage repository 130) that is used when the control engine 106 communicates with (e.g., sends signals to, receives signals from) a user 150 (including an associated user system 155), the network manager 180, the other electrical devices 102-N, the sensor devices 165, one or more WACs 185, and/or the power source 187. In some cases, the communication module 108 accesses the stored data 134 to determine which communication protocol is within the capability of a user device 155 for a communication signal 195 sent by the control engine 106. In addition, the communication module 108 can interpret the communication protocol of a communication (e.g., a communication signal 195) received by the controller 104 so that the control engine 106 can interpret the communication.

The communication module 108 can send data (e.g., protocols 132, stored data 134) directly to and/or retrieve data directly from the storage repository 130. Alternatively, the control engine 106 can facilitate the transfer of data between the communication module 108 and the storage repository 130. The communication module 108 can also provide encryption to data that is sent by the controller 104 and decryption to data that is received by the controller 104. The communication module 108 can also provide one or more of a number of other services with respect to data sent from and received by the controller 104. Such services can include, but are not limited to, data packet routing information and procedures to follow in the event of data interruption. In such a case, the communication module 108 can process a communication signal 195 received by the transceiver 124 (as from a user device 155), and generate a subsequent communication signal 195 for the control engine 106, where the subsequent communication signal 195 includes information (e.g., UUID, a destination within the volume of space 199) contained in the previous communication signal 195.

The timer 110 of the controller 104 can track clock time, intervals of time, an amount of time, and/or any other measure of time. The timer 110 can also count the number of occurrences of an event, whether with or without respect to time. Alternatively, the control engine 106 can perform the counting function. The timer 110 is able to track multiple time measurements concurrently. The timer 110 can measure the time of flight (ToF) of one or more communication signals 195, even simultaneously. The timer 110 can track time periods based on an instruction received from the control engine 106, based on an instruction received from a user 150 (including an associated user system 155), based on an instruction programmed in the software for the controller 104, based on some other condition or from some other component, or from any combination thereof.

The power module 112 of the controller 104 provides power to one or more other components (e.g., timer 110, control engine 106) of the controller 104. In addition, in certain example embodiments, the power module 112 can provide power to the power supply 140 of the electrical device 102. The power module 112 can include one or more of a number of single or multiple discrete components (e.g., transistor, diode, resistor), and/or a microprocessor. The power module 112 may include a printed circuit board, upon which the microprocessor and/or one or more discrete components are positioned.

The power module 112 can include one or more components (e.g., a transformer, a diode bridge, an inverter, a converter) that receives power (for example, through an electrical cable) from a source external to the electrical device 102 and generates power of a type (e.g., alternating current, direct current) and level (e.g., 12V, 24V, 120V) that can be used by the other components of the controller 104 and/or by the power supply 140. In addition, or in the alternative, the power module 112 can be a source of power in itself to provide signals to the other components of the controller 104 and/or the power supply 140. For example, the power module 112 can include an energy storage device (e.g., a battery). As another example, the power module 112 can include a localized photovoltaic power system.

The hardware processor 120 of the controller 104 executes software in accordance with one or more example embodiments. Specifically, the hardware processor 120 can execute software on the control engine 106 or any other portion of the controller 104, as well as software used by a user 150 (including an associated user system 155), the network manager 180, the sensor devices 165, one or more WACs 185, the power source 187, and/or one or more of the other electrical devices 102-N. The hardware processor 120 can be an integrated circuit, a central processing unit, a multi-core processing chip, a multi-chip module including multiple multi-core processing chips, or other hardware processor in one or more example embodiments. The hardware processor 120 is known by other names, including but not limited to a computer processor, a microprocessor, and a multi-core processor.

In one or more example embodiments, the hardware processor 120 executes software instructions stored in memory 122. The memory 122 includes one or more cache memories, main memory, and/or any other suitable type of memory. The memory 122 is discretely located within the controller 104 relative to the hardware processor 120 according to some example embodiments. In certain configurations, the memory 122 can be integrated with the hardware processor 120.

In certain example embodiments, the controller 104 does not include a hardware processor 120. In such a case, the controller 104 can include, as an example, one or more field programmable gate arrays (FPGA), one or more insulated-gate bipolar transistors (IGBTs), and/or one or more integrated circuits (ICs). Using FPGAs, IGBTs, ICs, and/or other similar devices known in the art allows the controller 104 (or portions thereof) to be programmable and function according to certain logic rules and thresholds without the use of a hardware processor. Alternatively, FPGAs, IGBTs, ICs, and/or similar devices can be used in conjunction with one or more hardware processors 120.

The transceiver 124 of the controller 104 can send (using a transmitter) and/or receive (using a receiver) control and/or communication signals, including communication signals 195. Specifically, the transceiver 124 can be used to transfer data between the controller 104 and a user 150 (including an associated user system 155), the network manager 180, the other electrical devices 102-N, one or more of the sensor devices 165, one or more WACs 185, and/or the power source 187. The transceiver 124 can use wired and/or wireless technology. The transceiver 124 can be configured in such a way that the control and/or communication signals sent and/or received by the transceiver 124 can be received and/or sent by another transceiver that is part of a user 150 (including an associated user system 155), the network manager 180, the other electrical devices 102-N, one or more sensor devices 165, one or more WACs 185, and/or the power source 187.

When the transceiver 124 uses wireless technology, any type of wireless technology can be used by the transceiver 124 in sending and receiving signals (e.g., communication signals 195). Such wireless technology can include, but is not limited to, Wi-Fi, visible light communication, infrared (IR), cellular networking, Zigbee, BLE, and Bluetooth. For example, the transceiver 124 can include a Zigbee transmitter, a Zigbee receiver, a BLE receiver, a BLE transmitter, an active IR transmitter, and/or an active IR receiver. The transceiver 124 can use one or more of any number of suitable communication protocols (e.g., ISA100, HART) when sending and/or receiving signals, including communication signals 195. Such communication protocols can be stored in the protocols 132 of the storage repository 130. Further, any transceiver information for a user 150 (including an associated user system 155), the network manager 180, the other electrical devices 102-N, the sensor devices 165, one or more WACs 185, and/or the power source 187 can be part of the stored data 134 (or similar areas) of the storage repository 130.

Optionally, in one or more example embodiments, the security module 128 secures interactions between the controller 104, a user 150 (including an associated user system 155), the network manager 180, the other electrical devices 102-N, the sensor devices 165, one or more WACs 185, and/or the power source 187. More specifically, the security module 128 authenticates communication from software based on security keys verifying the identity of the source of the communication. For example, user software may be associated with a security key enabling the software of a user system 155 of a user 150 to interact with the controller 104 of the electrical device 102-1. Further, the security module 128 can restrict receipt of information, requests for information, and/or access to information in some example embodiments.

As mentioned above, aside from the controller 104 and its components, the electrical device 102-1 can include a power supply 140, one or more sensor devices 165, one or more optional antennae 175, an optional switch 145, and one or more electrical device components 142. The electrical device components 142 of the electrical device 102-1 are devices and/or components typically found in the electrical device 102-1 to allow the electrical device 102-1 to operate. An electrical device component 142 can be electrical, electronic, mechanical, or any combination thereof. The electrical device 102-1 can have one or more of any number and/or type of electrical device components 142. For example, when the electrical device 102-1 is a light fixture, examples of such electrical device components 142 can include, but are not limited to, a light source, a light engine, a heat sink, an electrical conductor or electrical cable, a terminal block, a lens, a diffuser, a reflector, an air moving device, a baffle, a dimmer, and a circuit board.

The power supply 140 of the electrical device 102-1 provides power to one or more of the electrical device components 142. The power supply 140 can be substantially the same as, or different than, the power module 112 of the controller 104. The power supply 140 can include one or more of a number of single or multiple discrete components (e.g., transistor, diode, resistor), and/or a microprocessor. The power supply 140 may include a printed circuit board, upon which the microprocessor and/or one or more discrete components are positioned.

The power supply 140 can include one or more components (e.g., a transformer, a diode bridge, an inverter, a converter) that receives power (for example, through an electrical cable) from or sends power to the power module 112 of the controller 104. The power supply can generate power of a type (e.g., alternating current, direct current) and level (e.g., 12V, 24V, 120V) that can be used by the recipients (e.g., the electrical device components 142, the controller 104) of such power. In addition, or in the alternative, the power supply 140 can receive power from the power source 187. In addition, or in the alternative, the power supply 140 can be or include a source of power in itself. For example, the power supply 140 can include an energy storage device (e.g., a battery), a localized photovoltaic power system, or some other source of independent power.

Each of the one or more sensor devices 165 of the electrical device 102-1 can include any type of sensing device that measures one or more parameters. Examples of types of sensor devices 165 can include, but are not limited to, a passive infrared sensor, a photocell, a pressure sensor, an air flow monitor, a gas detector, a voltmeter, an ammeter, and a resistance temperature detector. Examples of a parameter that is measured by a sensor device 165 can include, but are not limited to, occupancy in the volume of space 199, motion in the volume of space 199, a temperature, a level of gas, a level of humidity, an amount of ambient light in the volume of space 199, voltage, current, power, and a pressure wave.

In some cases, the parameter or parameters measured by a sensor device 165 can be used to operate one or more of the electrical device components 142 of the electrical device 102-1. In addition, or in the alternative, the one or more parameters measured by a sensor device 165 can be used to locate one or more user devices 155 in the volume of space 199 in accordance with certain example embodiments. For example, if a sensor device 165 is configured to detect the presence of a user device 155, that information can be used to determine whether a communication (e.g., a communication signal 195) received from the user device 155 should be forwarded to a network manager 180.

A sensor device 165 can be an integrated sensor. An integrated sensor has both the ability to sense and measure at least one parameter and the ability to communicate with another component (e.g., a user device 155, a WAC 185). The communication capability of a sensor device 165 that is an integrated sensor can include one or more communication devices that are configured to communicate with, for example, the controller 104 of the electrical device 102-1, a WAC 185, and/or a controller (substantially similar to the controller 104 described herein) of another electrical device 102-N. For example, an integrated sensor device 165 can include a passive infrared (PIR) sensor, a transceiver that sends and receives signals using Zigbee, a receiver that receives signals using BLE, and a receiver that actively receives IR signals. In such a case, the PIR sensor measures IR light radiating from objects in its field of view, often for the purpose of detecting motion.

Each sensor device 165 can use one or more of a number of communication protocols. This allows a sensor device 165 to communicate with one or more components (e.g., a user device 155, a WAC 185, one or more other integrated sensor devices 165) of the system 100. The communication capability of a sensor device 165 that is an integrated sensor can be dedicated to the sensor device 165 and/or shared with the controller 104 of the electrical device 102-1. When the system 100 includes multiple integrated sensor devices 165, one integrated sensor device 165 can communicate, directly or indirectly, with one or more of the other integrated sensor devices 165 in the system 100.

If the communication capability of a sensor device 165 that is an integrated sensor is dedicated to the sensor device 165, then the sensor device 165 can include one or more components (e.g., a transceiver 124, a communication module 108), or portions thereof, that are substantially similar to the corresponding components described above with respect to the controller 104. A sensor device 165 can be associated with the electrical device 102-1 and/or another electrical device 102 in the system 100. A sensor device 165 can be located within the housing 103 of the electrical device 102-1, disposed on the housing 103 of the electrical device 102-1, or located outside the housing 103 of the electrical device 102-1.

In certain example embodiments, a sensor device 165 can include an energy storage device (e.g., a battery) that is used to provide power, at least in part, to some or all of the sensor device 165. In such a case, the energy storage device can be the same as, or independent of, an energy storage device or other power supply 140 of the electrical device 102-1. The optional energy storage device of the sensor module 165 can operate at all times or when the power supply of the electrical device 102-1 is interrupted. Further, a sensor device 165 can utilize or include one or more components (e.g., memory 122, storage repository 130, transceiver 124) found in the controller 104. In such a case, the controller 104 can provide the functionality of these components used by the sensor device 165. Alternatively, the sensor device 165 can include, either on its own or in shared responsibility with the controller 104, one or more of the components of the controller 104. In such a case, the sensor device 165 can correspond to a computer system as described below with regard to FIG. 2.

As discussed above, the electrical device 102-1 can include one or more optional antennae 175. An antenna 175 is an electrical device that converts electrical power to communication signals 195 (for transmitting) and communication signals 195 to electrical power (for receiving). In transmission, a radio transmitter (e.g., transceiver 124) supplies, through the optional switch 145 when multiple antenna 175 are involved, an electric current oscillating at radio frequency (i.e. a high frequency alternating current (AC)) to the terminals of the antenna 175, and the antenna 175 radiates the energy from the current as communication signals 195. In reception, an antenna 175, when included in the electrical device 102, intercepts some of the power of communication signals 195 in order to produce a tiny voltage at its terminals, that is applied to a receiver (e.g., transceiver 124), in some cases through an optional switch 145, to be amplified.

An antenna 175 can typically consist of an arrangement of electrical conductors that are electrically connected to each other (often through a transmission line) to create a body of the antenna 175. The body of the antenna 175 is electrically coupled to the transceiver 124. An oscillating current of electrons forced through the body of an antenna 175 by the transceiver 124 will create an oscillating magnetic field around the body, while the charge of the electrons also creates an oscillating electric field along the body of the antenna 175. These time-varying fields radiate away from the antenna 175 into space as a moving transverse communication signal 195 (often an electromagnetic field wave). Conversely, during reception, the oscillating electric and magnetic fields of an incoming communication signal 195 exert force on the electrons in the body of the antenna 175, causing portions of the body of the antenna 175 to move back and forth, creating oscillating currents in the antenna 175.

In certain example embodiments, an antenna 175 can be disposed at, within, or on any portion of the electrical device 102-1. For example, an antenna 175 can be disposed on the housing 103 of the electrical device 102-1 and extend away from the electrical device 102-1. As another example, an antenna 175 can be insert molded into a lens of the electrical device 102-1. As another example, an antenna 175 can be two-shot injection molded into the housing 103 of the electrical device 102-1. As yet another example, an antenna 175 can be adhesive mounted onto the housing 103 of the electrical device 102-1. As still another example, an antenna 175 can be pad printed onto a circuit board within the cavity 101 formed by the housing 103 of the electrical device 102-1. As yet another example, an antenna 175 can be a chip ceramic antenna that is surface mounted. As still another example, an antenna 175 can be a wire antenna.

When there are multiple antennae 175 (or other forms of multiple communication points) as part of the electrical device 102-1, there can also be an optional switch 145, which allows for selection of one communication point at a given point in time. In such a case, each antenna 175 can be electrically coupled to the switch 145, which in turn is electrically coupled to the transceiver 124. The optional switch 145 can be a single switch device or a number of switch devices arranged in series and/or in parallel with each other. The switch 145 determines which antenna 175 is coupled to the transceiver 124 at any particular point in time. A switch 145 can have one or more contacts, where each contact has an open state (position) and a closed state (position).

In the open state, a contact of the switch 145 creates an open circuit, which prevents the transceiver 124 from delivering a communication signal 195 to or receiving a communication signal 195 from the antenna 175 electrically coupled to that contact of the switch 145. In the closed state, a contact of the switch 145 creates a closed circuit, which allows the transceiver 124 to deliver a communication signal 195 to or receive a communication signal 195 from the antenna 175 electrically coupled to that contact of the switch 145. In certain example embodiments, the position of each contact of the switch 145 is controlled by the control engine 106 of the controller 104.

If the switch 145 is a single device, the switch 145 can have multiple contacts. In any case, only one contact of the switch 145 can be active (closed) at any point in time in certain example embodiments. Consequently, when one contact of the switch 145 is closed, all other contacts of the switch 145 are open in such example embodiments.

Figure 2:
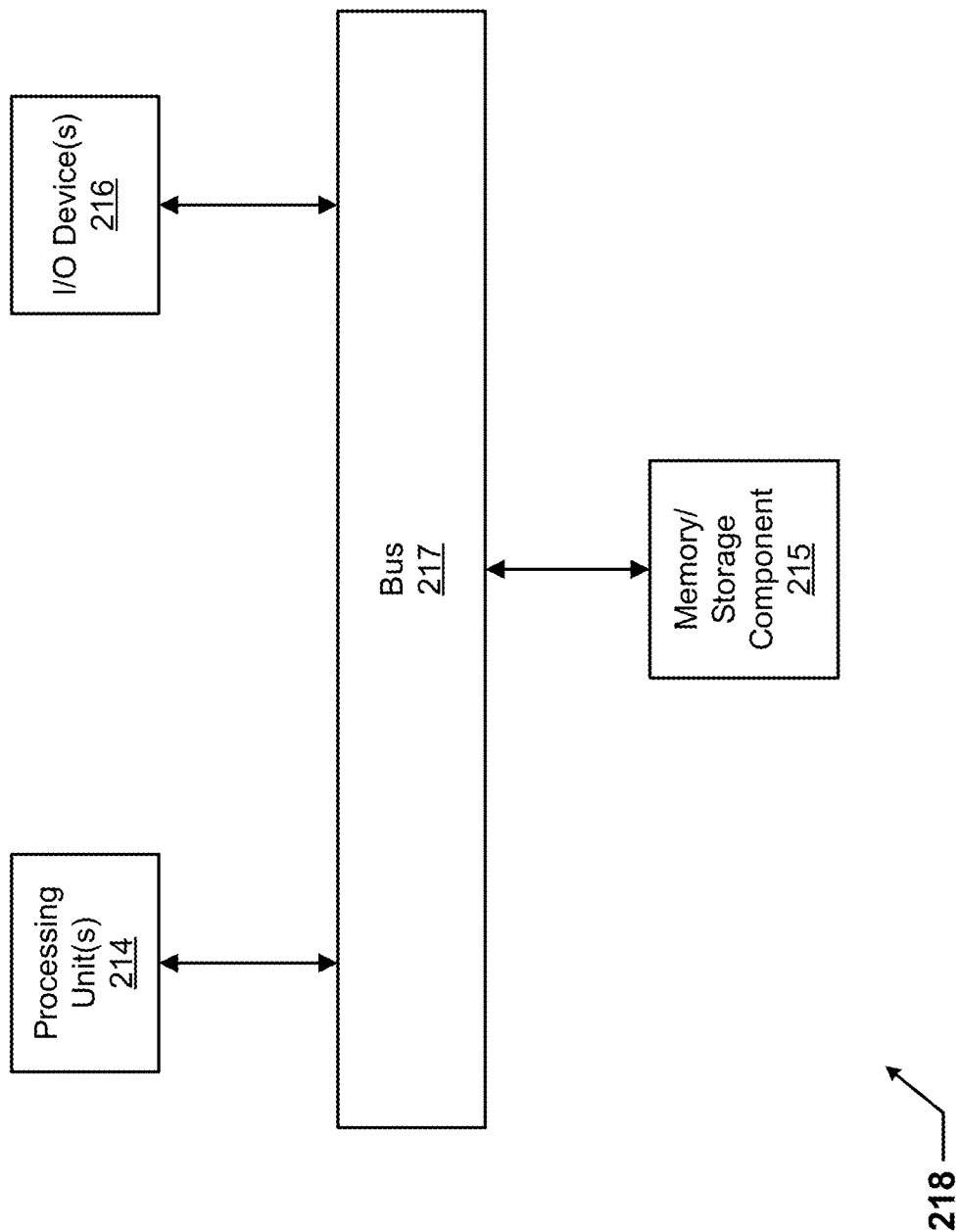
FIG. 2 shows a computing device in accordance with certain example embodiments.

FIG. 2 illustrates one embodiment of a computing device 218 that implements one or more of the various techniques described herein, and which is representative, in whole or in part, of the elements described herein pursuant to certain exemplary embodiments. For example, computing device 218 can be implemented in the electrical device 102-1 of FIG. 1 in the form of the hardware processor 120, the memory 122, and the storage repository 130, among other components. Computing device 218 is one example of a computing device and is not intended to suggest any limitation as to scope of use or functionality of the computing device and/or its possible architectures. Neither should computing device 218 be interpreted as having any dependency or requirement relating to any one or combination of components illustrated in the example computing device 218.

Computing device 218 includes one or more processors or processing units 214, one or more memory/storage components 215, one or more input/output (I/O) devices 216, and a bus 217 that allows the various components and devices to communicate with one another. Bus 217 represents one or more of any of several types of bus structures, including a memory bus or memory controller, a peripheral bus, an accelerated graphics port, and a processor or local bus using any of a variety of bus architectures. Bus 217 includes wired and/or wireless buses.

Memory/storage component 215 represents one or more computer storage media. Memory/storage component 215 includes volatile media (such as random access memory (RAM)) and/or nonvolatile media (such as read only memory (ROM), flash memory, optical disks, magnetic disks, and so forth). Memory/storage component 215 includes fixed media (e.g., RAM, ROM, a fixed hard drive, etc.) as well as removable media (e.g., a Flash memory drive, a removable hard drive, an optical disk, and so forth).

One or more I/O devices 216 allow a customer, utility, or other user to enter commands and information to computing device 218, and also allow information to be presented to the customer, utility, or other user and/or other components or devices. Examples of input devices include, but are not limited to, a keyboard, a cursor control device (e.g., a mouse), a microphone, a touchscreen, and a scanner. Examples of output devices include, but are not limited to, a display device (e.g., a monitor or projector), speakers, outputs to a lighting network (e.g., DMX card), a printer, and a network card.

Various techniques are described herein in the general context of software or program modules. Generally, software includes routines, programs, objects, components, data structures, and so forth that perform particular tasks or implement particular abstract data types. An implementation of these modules and techniques are stored on or transmitted across some form of computer readable media. Computer readable media is any available non-transitory medium or non-transitory media that is accessible by a computing device. By way of example, and not limitation, computer readable media includes "computer storage media".

"Computer storage media" and "computer readable medium" include volatile and non-volatile, removable and non-removable media implemented in any method or technology for storage of information such as computer readable instructions, data structures, program modules, or other data. Computer storage media include, but are not limited to, computer recordable media such as RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which is used to store the desired information and which is accessible by a computer.

The computer device 218 is connected to a network (not shown) (e.g., a LAN, a WAN such as the Internet, or any other similar type of network) via a network interface connection (not shown) according to some exemplary embodiments. Those skilled in the art will appreciate that many different types of computer systems exist (e.g., desktop computer, a laptop computer, a personal media device, a mobile device, such as a cell phone or personal digital assistant, or any other computing system capable of executing computer readable instructions), and the aforementioned input and output means take other forms, now known or later developed, in other exemplary embodiments. Generally speaking, the computer system 218 includes at least the minimal processing, input, and/or output means necessary to practice one or more embodiments.

Further, those skilled in the art will appreciate that one or more elements of the aforementioned computer device 218 is located at a remote location and connected to the other elements over a network in certain exemplary embodiments. Further, one or more embodiments is implemented on a distributed system having one or more nodes, where each portion of the implementation (e.g., control engine 106) is located on a different node within the distributed system. In one or more embodiments, the node corresponds to a computer system. Alternatively, the node corresponds to a processor with associated physical memory in some exemplary embodiments. The node alternatively corresponds to a processor with shared memory and/or resources in some exemplary embodiments.

Figure 3:
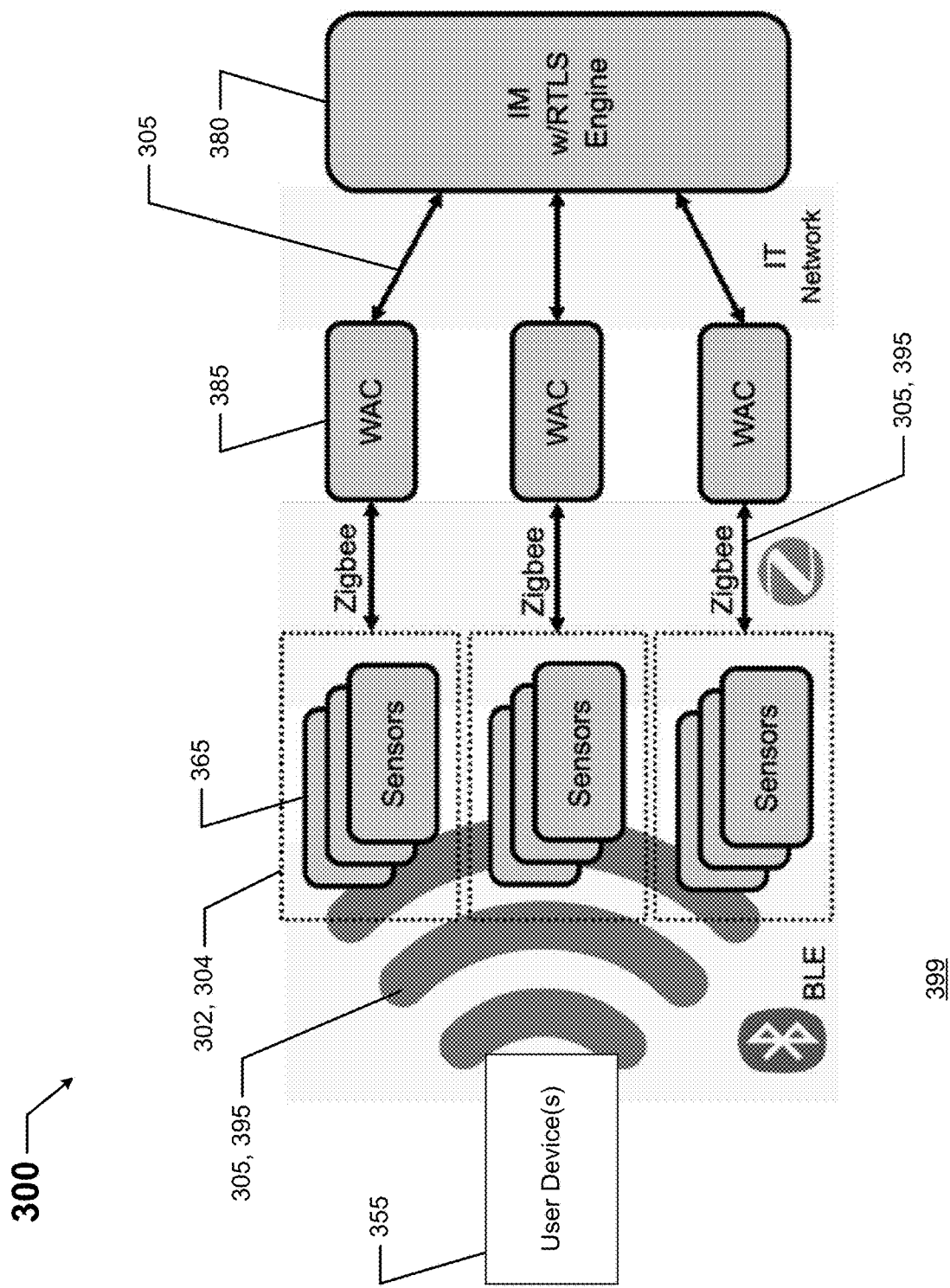
FIG. 3 shows a diagram of another system in accordance with certain example embodiments.

FIG. 3 shows a diagram of another RTLS system 300 in accordance with certain example embodiments. Referring to FIGS. 1 through 3, the RTLS system 300 includes a user 350 with a user system 355, a number of electrical devices 302 each having one or more sensor devices 365, a number of WACs 385, and a network manager 380 (in this case called an insight manager (IM) with a RTLS engine). The RTLS system of FIG. 3 is arranged in a hierarchy, with the network manager 380 at the top of the structure. Each of these components of the system 300 of FIG. 3 can be substantially the same as the corresponding component of the RTLS system 100 of FIG. 1. For example, each sensor device 365 can be an integrated sensor that includes a Zigbee-enabled transceiver, a BLE-enabled receiver, a PIR sensor, and an active IR receiver.

In this particular case, the user devices 355 are the physical entities that are tracked by the RTLS system 300. From the perspective of the system 300, each user device 355 is associated with a user 350. In this example, the user devices 355 use BLE (a form of communication link 305) to "beacon" or broadcast communication signals 395 at a certain rate. A communication signal 395 is a broadcast message that, at a minimum, identifies the user device 355 (if not also the user 350) sending the communication signal 195. One or more of the integrated sensor devices 365 and/or one or more controllers of the electrical devices 302 receive these communication signals 395 over the BLE-enabled communication links 305 and measures the RSSI along with other data included in the communication signal 395.

This RSSI information is the key piece of data in a communication signal 390 that allows a WAC 385 and/or network manager 380 to locate, in real time, the user device 355 (and corresponding user 350) within a volume of space 399 (e.g., in X-Y coordinates, in X-Y-Z coordinates). As used herein, "real time" refers to a user's perspective of the system and means that objects (e.g., a user device 355) can be located within the time in which the signals are transmitted and processed, such as a few milliseconds to within a few seconds, which time is virtually real time from the user's perspective. Integrated sensor devices 365 communicate with one or more WACs 385 using Zigbee-enabled communication links 305. In this case, an integrated sensor device 365 is a Zigbee-enabled device as well as a BLE-enabled device, and so a sensor device 365 can be paired with a single WAC 385. Similarly, a controller 304 of an electrical device 302 can be a Zigbee-enabled device as well as a BLE-enabled device, and so a controller 304 can be paired with a single WAC 385.

The WACs 385, upon receiving the communication signals 395 from the sensor devices 365 and/or the controllers 304 on the Zigbee-enabled communication links 305, send the information in these communication signals 395 to the network manager 380, which process all of this information (e.g., using one or more algorithms 133) to locate a user device 355 within the volume of space 399 in real time and subsequently provide navigation services to the user 350, through the user device 355, in real time. The network manager 380 can store this information and use it for trending analysis, predictive analysis, and/or any other analysis that may be useful.

BLE proximity methods are widely used in the industry to estimate the distance between a BLE transmitter (in this case, a user device 355) and a BLE receiver (in this case, a sensor device 365 or a controller 304). In a dense and uniformly distributed infrastructure of electrical devices 302 (e.g., a lighting system), these methods can be optimized to achieve greater accuracy by comparing the RSSI at many BLE receivers and performing various calculations (by a WAC 385 or network manager 380) to estimate the location of a user device 355.

Figure 4:
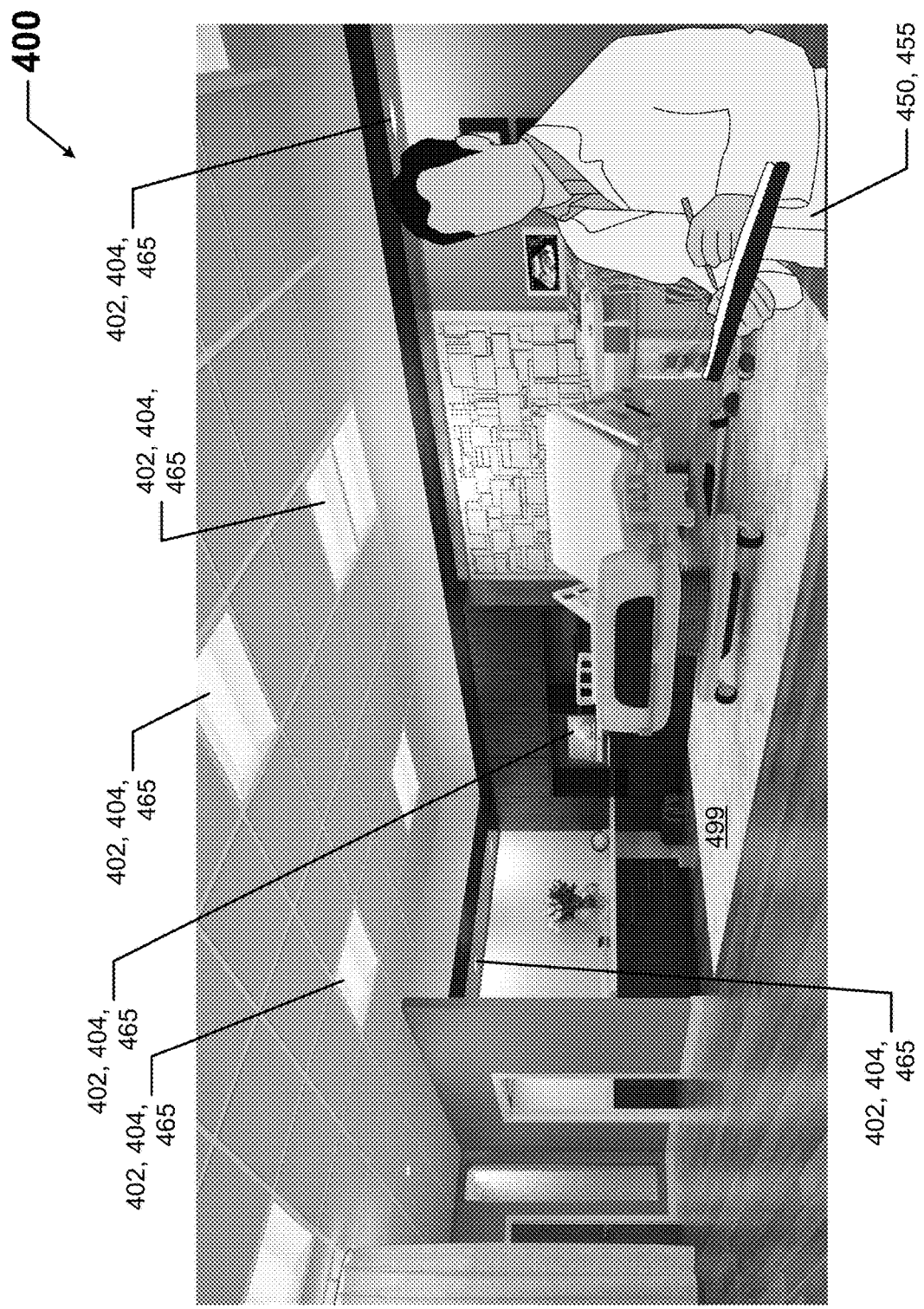
FIG. 4 shows a lighting system in a healthcare environment in accordance with certain example embodiments.

FIG. 4 shows a lighting system 400 that can be used for providing real-time navigation services to a user device 355 of a user 350 in accordance with certain example embodiments. Referring to FIGS. 1 through 4, the lighting system 400 includes a number of electrical devices 402, principally in the form of light fixtures, located in a volume of space 499 that includes a hospital room within a clinic or hospital. A lighting system provides unique advantages for implementing an example RTLS because the density of the electrical devices (light fixtures) supports a dense network of sensors for locating and tracking objects (e.g., a user device 355). Of the electrical devices 402 that are light fixtures, there are seven troffer light fixtures and five down can light fixtures disposed in the ceiling of the room. There is also an electrical device 402 in the form of a computer monitor. In this case, each electrical device 402 includes a controller 404 and a sensor device 465, substantially similar to the controller 104 and the sensor devices 165 discussed above. There is also a user 450 (a resident doctor) holding a user device 455 in the form of an electronic tablet in the volume of space 499. The user device 455 is capable of communicating with the controllers 404 and/or the sensor devices 465 of the electrical devices 402.

Figure 5:
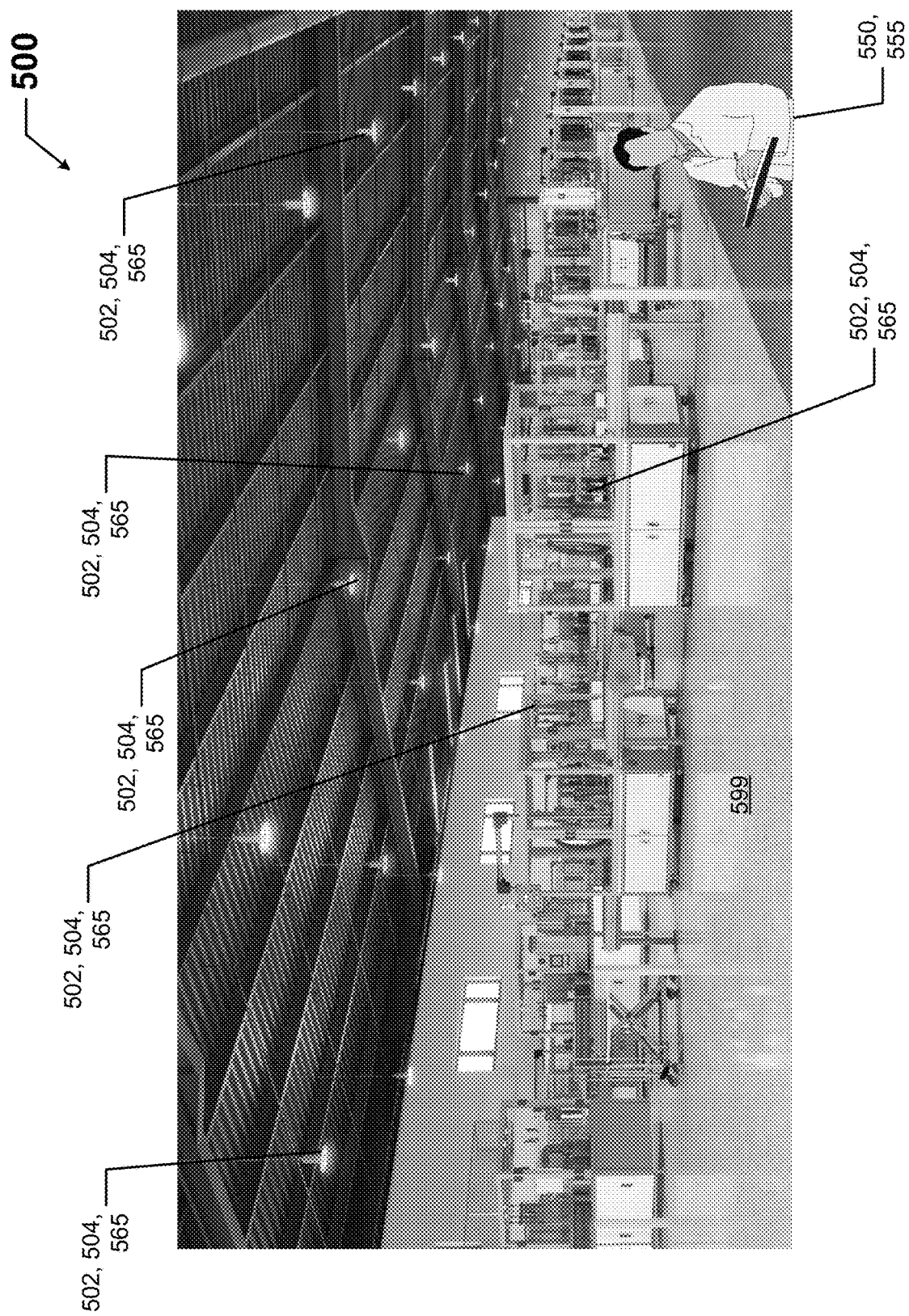
FIG. 5 shows a lighting system in a manufacturing environment in accordance with certain example embodiments.

FIG. 5 shows a lighting system 500 that can be used for providing real-time navigation services to a user device 555 of a user 550 in accordance with certain example embodiments. Referring to FIGS. 1 through 5, the lighting system 500 includes a number of electrical devices 502, principally in the form of light fixtures, located in a volume of space 599 that includes a manufacturing facility. Of the electrical devices 502 that are light fixtures, there are at least 56 Hi-Bay light fixtures suspended from the ceiling and at least 30 work stations located on the floor. In this case, each electrical device 502 includes a controller 504 and a sensor device 565, substantially similar to the controllers 104 and the sensor devices 165 discussed above. There is also a user 550 (a supervisor) with a user device 555 in the form of an electronic tablet shown in FIG. 5. The user device 555 in this case is configured to communicate with the controllers 504 and/or the sensor devices 565 of the electrical devices 502.

Figure 6:
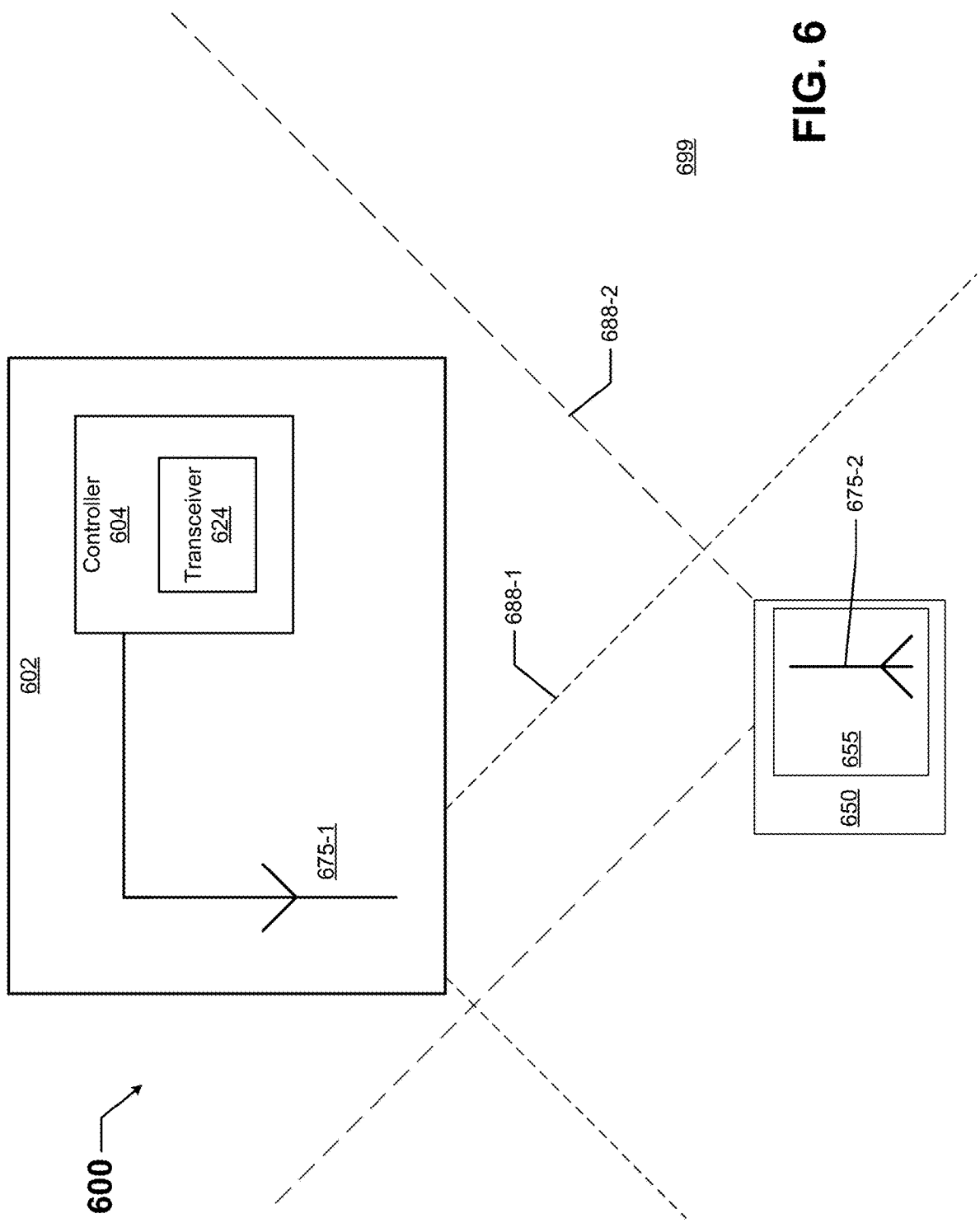
FIG. 6 shows a system for transceiving communication signals in a volume of space in accordance with certain example embodiments.

FIG. 6 shows a system 600 for transceiving communication signals in a volume of space 699 in accordance with certain example embodiments. Referring to FIGS. 1 through 6, located in the volume of space 699 of FIG. 6 is an electrical device 602 having a controller 604 (including a transceiver 624) and an antenna 675-1. Also located in the volume of space 699 is a user device 655 of a user 650, where the user device 655 has an antenna 675-2. These components of FIG. 6 are substantially the same as the corresponding components of FIG. 1 discussed above. As discussed above with respect to FIG. 1, the volume of space 699 can be of any size and/or in any location. For example, the volume of space 699 can be a room in an office building.

As shown in FIG. 6, the antenna 675-1 of the electrical device 602 can be located in the volume of space 699. Alternatively, the antenna 675-1 can be located on another electrical device (e.g., another light fixture, on a thermostat, on a clock/radio, on a security camera). In any case, it is possible that the antenna 675-1 can be located outside the volume of space 699, as long as the communication signals (e.g., communication signals 195) sent by the antenna 675-2 of the user device 655 of the user 650 are received by the antenna 675-1 of the electrical device 602. For example, when a communication signal is a RF signal, the communication signal can travel through walls, windows, floors, and ceilings.

The antenna 675-1, when combined with the transceiver 624 of the controller 604, has a communication range 688-1. The communication range 688-1 that defines a maximum volume within the volume of space 699 in which the transceiver 624 can send and receive signals. The user device 655 of the user 650 can have a communication range 688-2, which defines a maximum volume within the volume of space 699 in which the user device 655 can send and/or receive signals. The user device 655 can also include a controller, such as the controller 104 described above with respect to FIG. 1.

If the communication range 688-1 of the controller 604 of the electrical device 602 intersects with the communication range 688-2 of the user device 655, then the controller 604 and the user device 655 can transmit signals between each other. Conversely, if the communication range 688-1 of the controller 604 of the electrical device 602 fails to intersect the communication range 688-2 of the user device 655, then the controller 604 and the user device 655 fail to communicate with each other.

FIGS. 7A and 7B show a side and top view, respectively, of a system 700 in which a user device 755 is located in volume of space 799 in accordance with certain example embodiments. Referring to FIGS. 1 through 7B, also located in the volume of space 799 of FIGS. 7A and 7B are three electrical devices 702 in the form of light fixtures (specifically, electrical device 702-1, electrical device 702-2, and electrical device 702-3), where the electrical devices 702 are substantially similar to the electrical devices 102 of FIG. 1 above. Similarly, the user device 755 is substantially similar to the user device 155 of FIG. 1 above. As discussed above, the volume of space 799 can be of any size and/or in any location. For example, the volume of space 799 can be one or more rooms in a large office building.

As shown in FIGS. 7A and 7B, all of the electrical devices 702 can be located in the volume of space 799. Alternatively, one or more of the electrical devices 702 can be located outside the volume of space 799, as long as the communication signals (e.g., communication signals 195) sent by the transceiver (e.g., transceiver 124) of the electrical device 702 are received by the user device 755, and as long as the communication signals sent by the user device 755 are received by the transceiver of the corresponding electrical device 702, as applicable.

Each of the electrical devices 702 can include a controller and an associated transceiver, substantially similar to the controller 104 and associated transceiver 124 discussed above. In this example, the transceiver of electrical device 702-1, electrical device 702-2, and electrical device 702-3 can include a Zigbee-enabled receiver and a BLE-enabled transceiver. In such a case, the BLE-enabled receiver of each electrical device 702 is capable of transmitting communication signals (e.g., communication signals 195) in the form of RF signals with the user device 755.

FIG. 8 shows a system 800 of FIGS. 7A and 7B when a communication signal 895 is sent by electrical device 702-1 in accordance with certain example embodiments. Referring to FIGS. 1 through 8, the transceiver of each electrical device 702 has a broadcast range 888. In this case, the transceiver of electrical device 702-1 has broadcast range 888-1, the transceiver of electrical device 702-2 has broadcast range 888-2, and the transceiver of electrical device 702-3 has broadcast range 888-3. Since the user device 755 is located within the broadcast range 888-1 for the transceiver of electrical device 702-1, the user device 755 receives communication signal 895.

Specifically, the transceiver of electrical device 702-1 can send (e.g., broadcast) a communication signal 895 into the volume of space 799, and the user device 755 receives the communication signal 895 because the user device 755 is within the broadcast range 888-1. The communication signal 895 can be sent, as an example, using BLE. In alternative embodiments, the transceiver of each electrical device 702 can be enabled for some other communication protocol aside from BLE. Examples of such other communication protocols can include, but are not limited to, Bluetooth, Zigbee, and Wi-Fi. In any case, the user device 755 can receive the communication signal 895 sent by the transceiver of electrical device 702-1.

Figure 9:
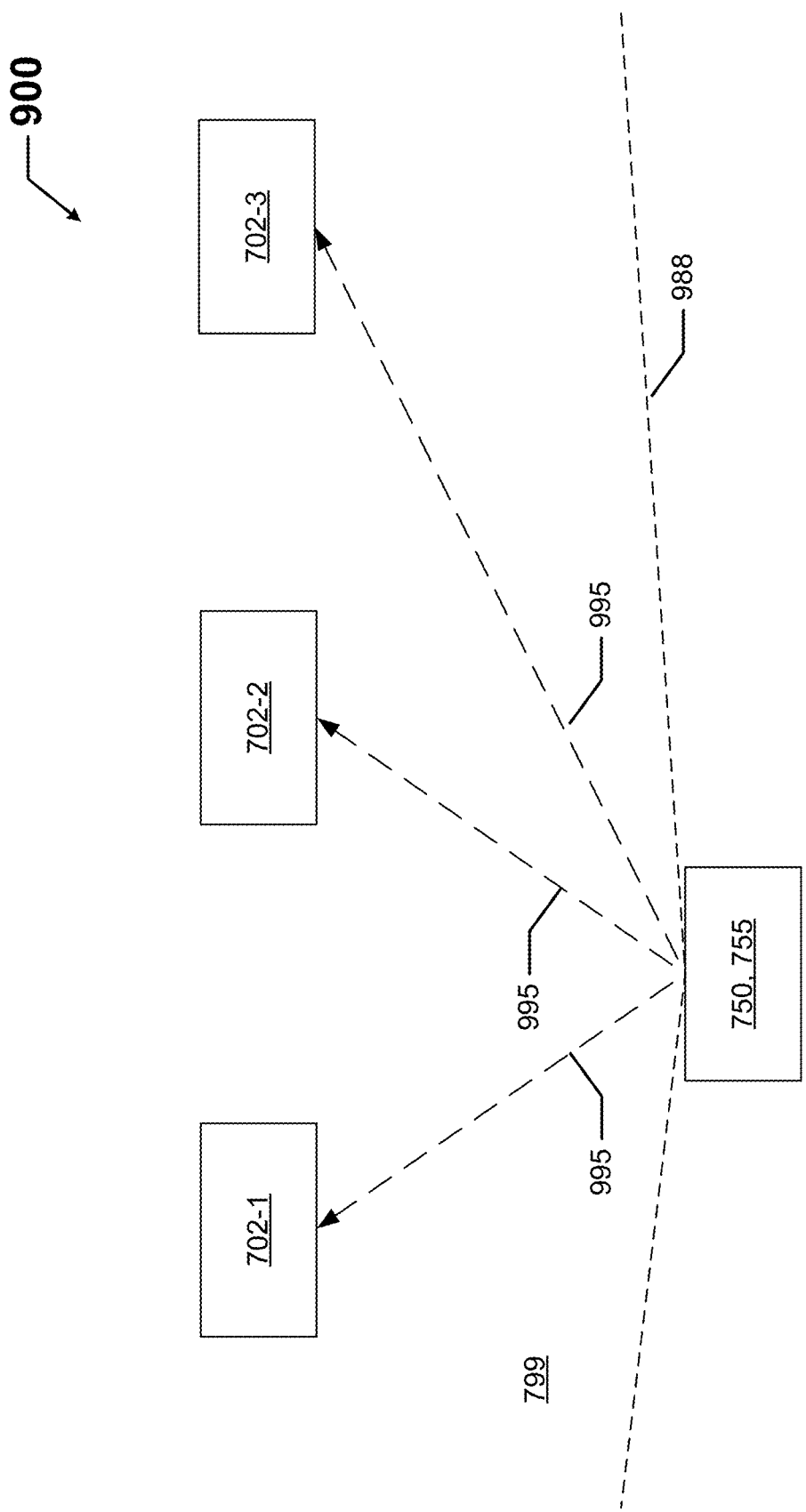
FIG. 9 shows the system of FIGS. 7A through 8 when a signal is sent by the user device in accordance with certain example embodiments.

FIG. 9 shows the system 900 of FIGS. 7A through 8 when a return communication signal 995 is sent by the user device 755 in accordance with certain example embodiments. Referring to FIGS. 1 through 9, the return communication signal 995 sent by the user device 755 can be in response to the communication signal 895 sent by electrical device 702-1, as shown in FIG. 8. Alternatively, the user device 755 can sent the communication signal 995 independent of the communication signal 895 sent by electrical device 702-1. As discussed above, the communication signal 995 broadcast by the user device 755 can include the UUID of the user device 755, as well as other code, such as, for example, identifying information of the electrical device 702-1 that sent the communication signal 895.

The user device 755 has a broadcast range 988, and all three of the electrical devices 702 are located within the broadcast range 988 of the user device 755. As a result, as shown in FIG. 9, all three of the electrical devices 702 receive the communication signal 995 broadcast by the user device 755. When each electrical device 702 receives the communication signal 995 broadcast by the user device 755, the controller of that electrical device 702 can process the communication signal 895 to determine its contents.

FIGS. 10 through 13 show an example of providing real time navigation services using multiple electrical devices 1002 in a volume of space 1099 (in this case, part of a hospital) in accordance with certain example embodiments. Referring to FIGS. 1 through 13, the volume of space 1099 of the system 1000 of FIG. 10 includes a nurse's station 1051, a lab 1052, a private office 1053 (e.g., of the resident physician), a hallway 1054, a surgical room 1056, a first short-term patient room 1057, a second short-term patient room 1058, a bathroom 1059, an IT/server room 1046, a long-term patient room 1044 having a bathroom 1041, and a supply closet 1043. While each room of the volume of space 1099 has furniture and other objects, most of those objects are not shown here for the sake of simplicity. The furniture shown in FIG. 10 includes a bed 1047 in the long-term patient room 1044 and cabinets/countertops 1019 in the lab 1052. As stated above, the controller of the user device 1055 can identify these objects/obstacles (e.g., using algorithms 133, using protocols 132, based on information provided by third parties) and take them into consideration when generating potential navigation paths.

Figure 10:
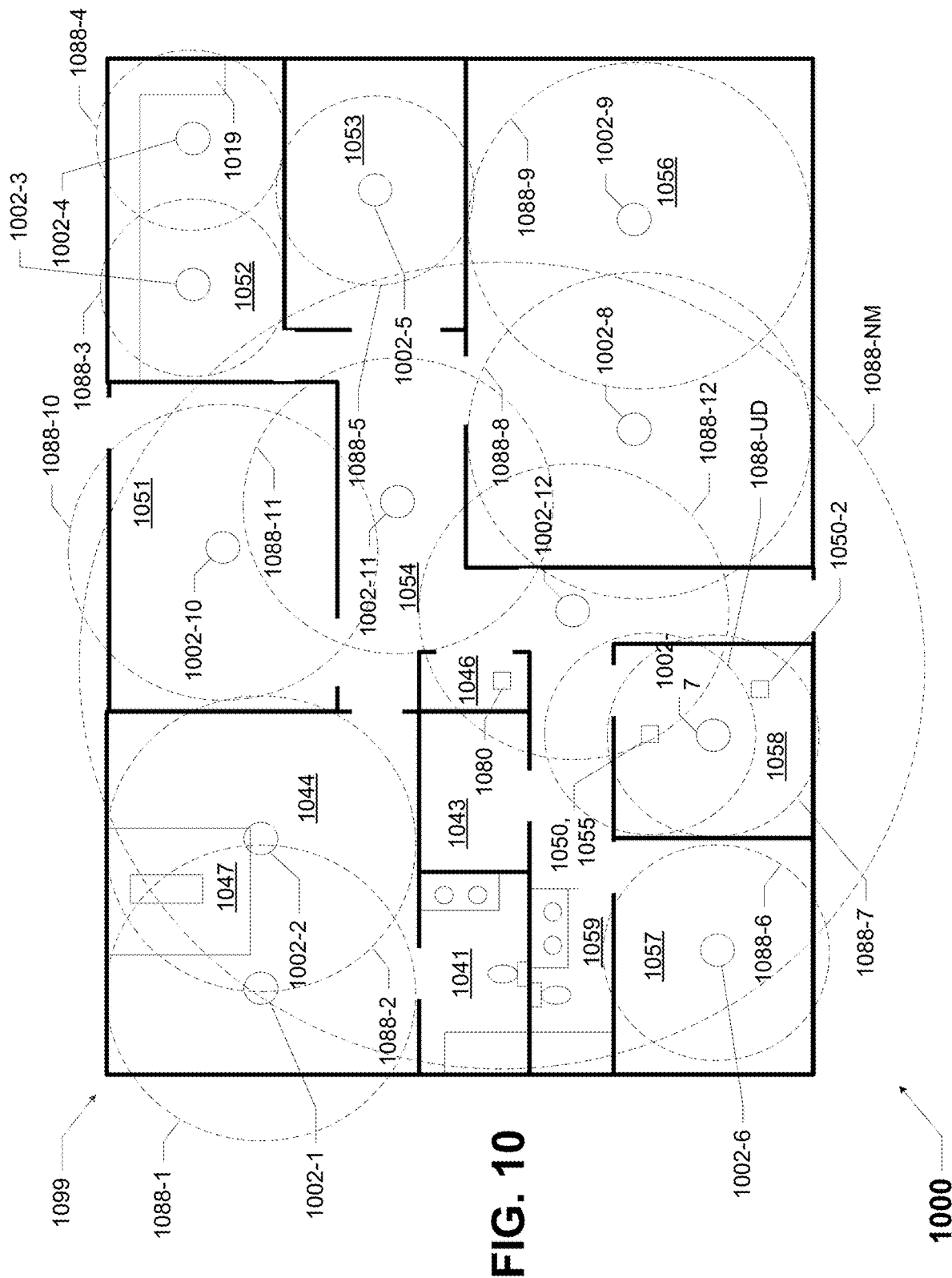
FIGS. 10 through 13 show an example of providing real time navigation services using multiple electrical devices in a volume of space in accordance with certain example embodiments.

There are a number of users 1050 shown in FIG. 10 at various locations throughout the volume of space 1099. User 1050 is a patient located in the second short-term patient room 1058. User 1050 has a user device 1055, which in this case is a hospital-issued tablet that can be used for providing the user 1050 with real-time navigation services among other services (e.g., receiving intake information, making future appointments, accessing lab results).

There are also a number of electrical devices 1002 positioned throughout the volume of space 1099. For example, as shown in FIG. 10, electrical device 1002-1 and electrical device 1002-2 are light fixtures that are disposed on the ceiling in the long-term patient room 1044. Electrical device 1002-3 and electrical device 1002-4 are light fixtures disposed on the ceiling of the lab 1052. Electrical device 1002-5 is a light fixture disposed on the ceiling of the private office 1053. Electrical device 1002-6 is a light fixture disposed on the ceiling of the first short-term patient room 1057. Electrical device 1002-7 is a light fixture disposed on the ceiling of the second short-term patient room 1058.

Electrical device 1002-8 and electrical device 1002-9 are light fixtures disposed on the ceiling of the surgical room 1056. Electrical device 1002-10 is a light fixture disposed on the ceiling of the nurse's station 1051. Electrical device 1002-11 and electrical device 1002-12 are light fixtures disposed on the ceiling of the hallway 1054. There are a number of other electrical devices (e.g., electrical outlets, other light fixtures, smoke detectors, $CO_2$ monitors, clocks, computers, printers, medical devices) that are disposed in the rooms of the volume of space 1099 but are not shown in FIG. 10 for the sake of simplicity. There is also a network manager 1080 disposed in the IT room 1066. The electrical devices 1002 shown in FIG. 10 can be substantially similar to the electrical devices 102 of FIG. 1, including components such as the controller 104. Also, the user 1050 and the user device 1055 of FIG. 10 can be substantially similar to the user 150 and user device 155 of FIG. 1. Further, the network manager 1080, which is integrated with the equipment in the IT/server room 1046, can be substantially similar to the network manager 180 of FIG. 1.

Each electrical device 1002, the network manager 1080, the user device 1055, and the user 1050 of FIG. 10 is capable of communicating with each other provided that they have overlapping communication ranges 1088. Electrical device 1002-1 has communication range 1085-1. Electrical device 1002-2 has communication range 1088-2. Electrical device 1002-3 has communication range 1088-3. Electrical device 1002-4 has communication range 1088-4. Electrical device 1002-5 has communication range 1088-5. Electrical device 1002-6 has communication range 1088-6. Electrical device 1002-7 has communication range 1088-7. Electrical device 1002-8 has communication range 1088-8. Electrical device 1002-9 has communication range 1088-9. Electrical device 1002-10 has communication range 1088-10. Electrical device 1002-11 has communication range 1088-11. Electrical device 1002-12 has communication range 1088-12. The network manager 1080 has communication range 1088-NM, and user device 1055 has communication range 1088-UD.

In this case, communication range 1088-1 of electrical device 1088-1 overlaps with communication range 1088-2 of electrical device 1002-2 and communication range 1088-NM of the network manager 1080. Communication range 1088-2 of electrical device 1088-2 overlaps with communication range 1088-1 of electrical device 1002-1, communication range 1088-10 of electrical device 1002-10, and communication range 1088-NM of the network manager 1080.

Communication range 1088-3 of electrical device 1088-3 overlaps with communication range 1088-4 of electrical device 1002-4 and communication range 1088-NM of the network manager 1080. Communication range 1088-4 of electrical device 1088-4 overlaps with communication range 1088-3 of electrical device 1002-3 and communication range 1088-5 of electrical device 1002-5. Communication range 1088-5 of electrical device 1088-5 overlaps with communication range 1088-NM of the network manager 1080, communication range 1088-4 of electrical device 1002-4, and communication range 1088-9 of electrical device 1002-9.

Communication range 1088-6 of electrical device 1088-6 overlaps with communication range 1088-NM of the network manager 1080. Communication range 1088-7 of electrical device 1088-7 overlaps with communication range 1088-NM of the network manager 1080 and communication range 1088-UD of the user device 1055. Communication range 1088-8 of electrical device 1088-8 overlaps with communication range 1088-NM of the network manager 1080 and communication range 1088-9 of electrical device 1002-9. Communication range 1088-9 of electrical device 1088-9 overlaps with communication range 1088-NM of the network manager 1080, communication range 1088-5 of electrical device 1002-5, and communication range 1088-8 of electrical device 1002-8.

Communication range 1088-10 of electrical device 1088-10 overlaps with communication range 1088-NM of the network manager 1080, communication range 1088-11 of electrical device 1002-11, and communication range 1088-2 of electrical device 1002-2. Communication range 1088-11 of electrical device 1088-11 overlaps with communication range 1088-NM of the network manager 1080, communication range 1088-8 of electrical device 1002-8, communication range 1088-10 of electrical device 1002-10, and communication range 1088-12 of electrical device 1002-12. Communication range 1088-12 of electrical device 1002-12 overlaps with communication range 1088-NM of the network manager 1080, communication range 1088-8 of electrical device 1002-8, communication range 1088-11 of electrical device 1002-11, communication range 1088-7 of electrical device 1002-7, and communication range 1088-UD of the user device 1055.

Communication range 1088-NM of the network manager 1080 overlaps with communication range 1088-1 of electrical device 1002-1, communication range 1088-2 of electrical device 1002-2, communication range 1088-3 of electrical device 1002-3, communication range 1088-5 of electrical device 1002-5, communication range 1088-6 of electrical device 1002-6, communication range 1088-7 of electrical device 1002-7, communication range 1088-8 of electrical device 1002-8, communication range 1088-9 of electrical device 1002-9, communication range 1088-UD of user device 1055, communication range 1088-10 of electrical device 1002-10, communication range 1088-11 of electrical device 1002-11, communication range 1088-12 of electrical device 1002-12, and communication range 1088-UD of the user device 1055.

Communication range 1088-UD of user device 1055 overlaps with communication range 1088-7 of electrical device 1002-7, communication range 1088-12 of electrical device 1002-12, and communication range 1088-NM of the network manager 1080. The communication range 1088 of an electrical device 1002, the network manager 1180, and/or the user device 1055 in FIG. 10 can be made larger or smaller, and these adjustments can be made by, for example, the user 1050, the network manager 1080, or automatically by a controller.

Given the relative orientation of the electrical devices 1002, the network manager 1080, the user 1050, and the user device 1055 in FIG. 10, the user device 1055 can communicate directly with electrical device 1002-7 and electrical device 1002-12 so that electrical device 1002-7 and electrical device 1002-12 can send and receive one or more communication signals (e.g., communication signal 195) with the user device 1055.

Figure 11:
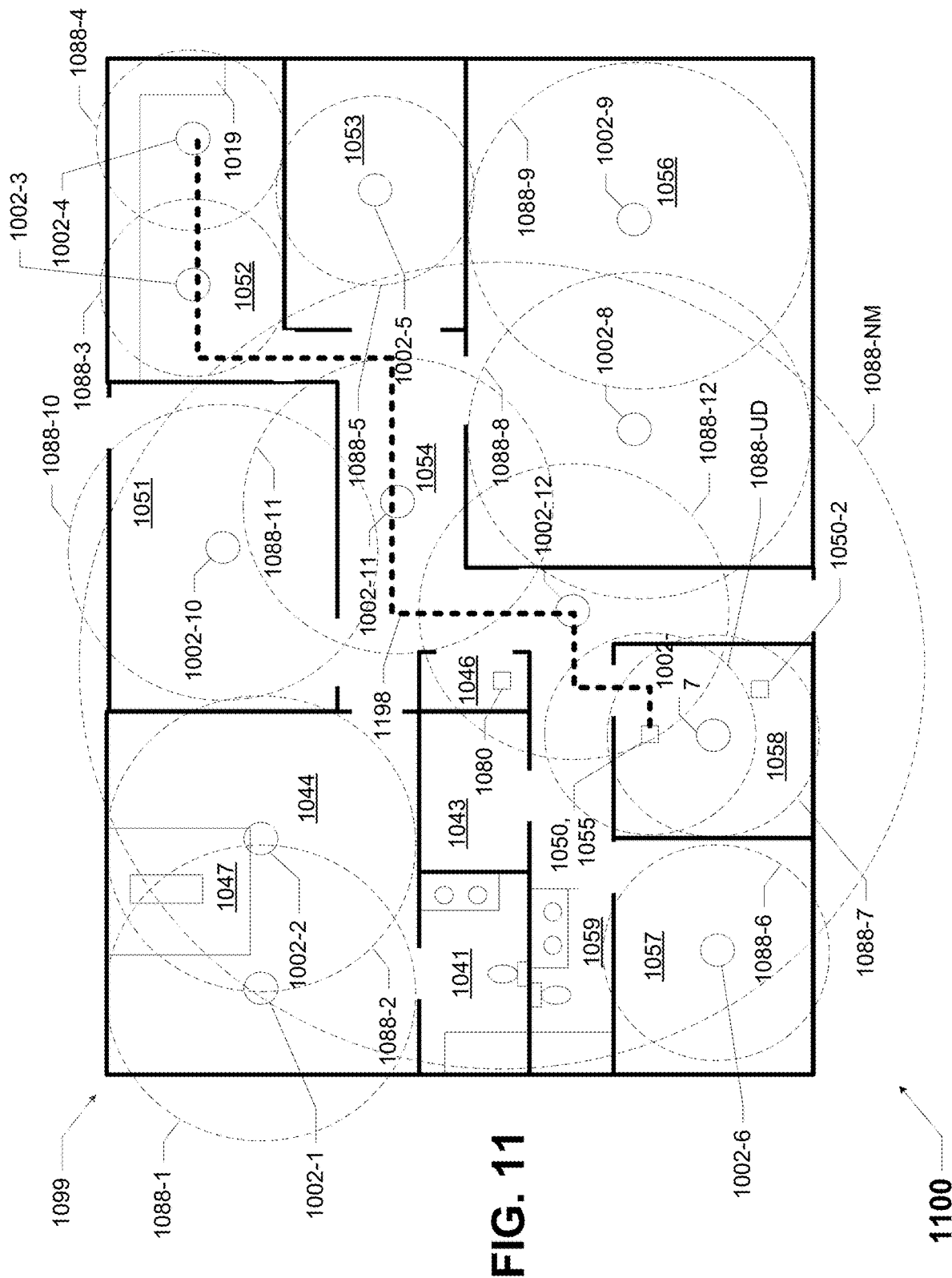

FIG. 11 shows a system 1100 identical to the system 1000 of FIG. 10, except that a navigation path 1198 has been provided to the user 1050 on the user device 1055 according to certain example embodiments. In this example, the user device 1055 receives an order from a doctor for the user 1050 to go to the lab 1052 to have some blood drawn. Upon receiving this order, the user device 1055 communicates directly or indirectly with a controller (e.g., in the network manager 1080, in one of the electrical devices 1002) that a navigation path 1198 through the volume of space 1099 is required to guide the user 1050 to arrive at the lab 1052. The order can also include a time or window of time at which the user 1050 is expected at the lab 1052. The order can be received in one or more of a number of ways, including but not limited to communication by the controller (e.g., controller 104) with another system of the hospital, receiving a scan of a bar code on the order, or a direct request received from a doctor.

In this case, the navigation path 1198 starts in the second short-term patient room 1058, proceeds through the hallway 1054, and finishes within the lab 1052. The navigation path 1198 can even provide a particular area of the lab 1052 (e.g., chair 6) as the termination point of the navigation path 1198. The navigation path 1198 can be presented to the user 1050 on the user device 1055 in any of a number of ways. For example, the display of the user device 1055 can show the view of FIG. 11, including the navigation path 1198. In addition, or in the alternative, text with a description of the next step (e.g., leave the room you are now in and turn right down the short hallway, away from the bathroom) or two along the navigation path 1198 can be shown on and/or broadcast from the user device 1055.

Figure 12:
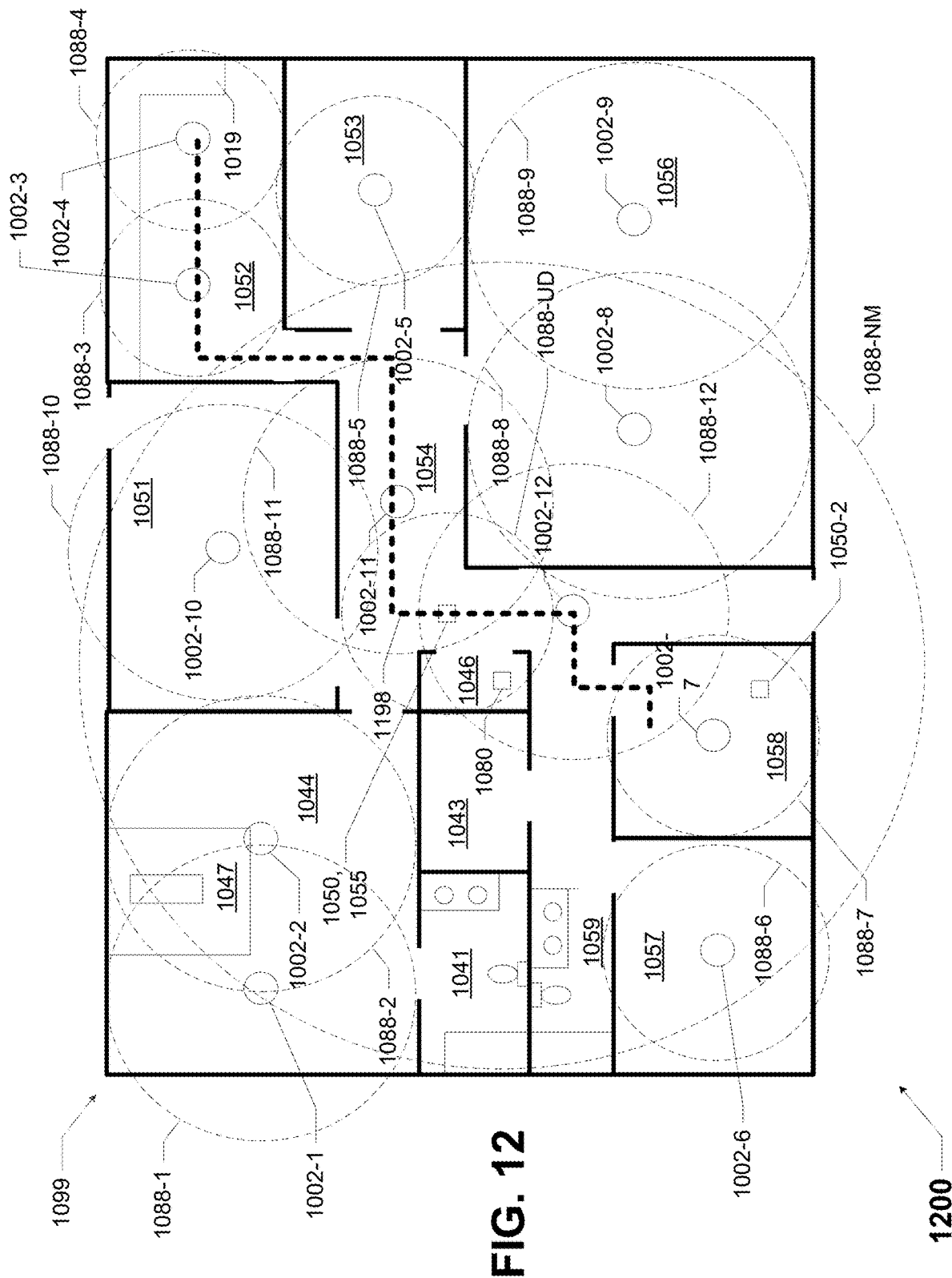
Figure 13:
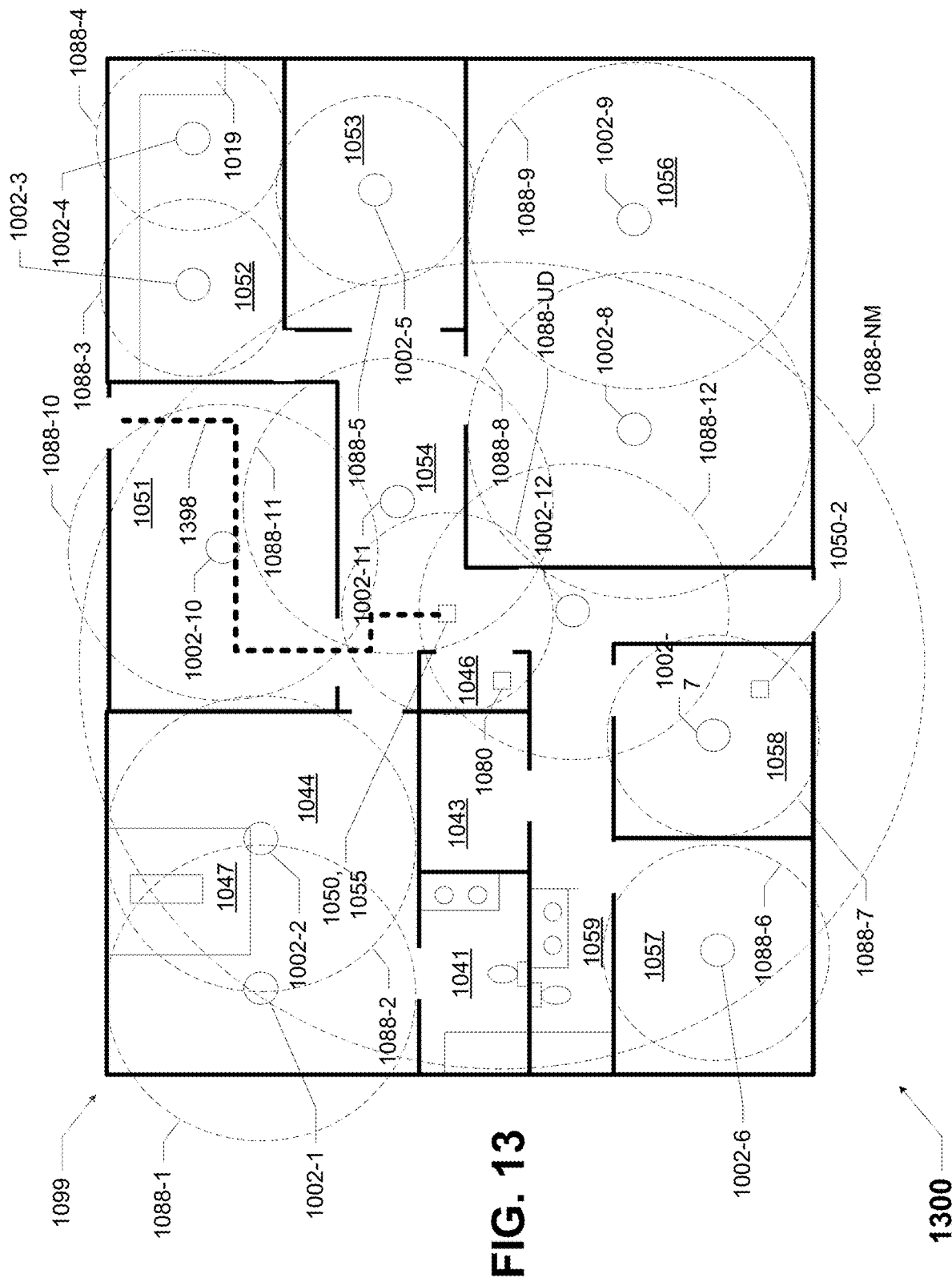

As the user 1050 travels along the navigation path 1198, as shown in the system 1200 of FIG. 12, the user device 1055 can receive feedback in real-time as to the navigation services. The system 1200 of FIG. 12 is identical to the system 1100 of FIG. 11, except that the user 1050 and the user device 1055 are in the hallway 1054 traveling along the navigation path 1198. At this point, the communication range 1088-UD of the user device 1055 intersects with the communication range 1088-8 of electrical device 1002-8, the communication range 1088-10 of electrical device 1002-10, the communication range 1088-11 of electrical device 1002-11, the communication range 1088-12 of electrical device 1002-12, and the communication range 1088-NM of the network manager 1080. The progress of the user 1050 along the navigation path 1198 toward the destination (in this case, the lab 1052) can be communicated through the user device 1055 to the user 1050 in real time.

The example system providing real time navigation services can also adapt based on events that occur in real time. For example, as shown in the system 1300 of FIG. 13, the navigation path 1398 can be altered in real time, and information regarding the reasons for the alteration can be provided to the user 1050 through the user device 1055. In this case, the change to the navigation path 1398 occurs at the same point in time as what is shown in FIG. 12, where the user 1050 and the user device 1055 are in the hallway 1054. Now, the new navigation path 1398 leads from the hallway 1054, through the nurse's station 1051, and through the doorway leading away from the nurse's station 1051.

The controller (e.g., of the network manager 1080, of an electrical device 1002) that is coordinating the navigation services can provide the rationale for the new navigation path 1398. For example, the controller can send communication signals to the user device 1055 so that the user device 1055 communicates (e.g., displays, emits audio) to the user 1050 that the lab technician has temporarily been called away, and so the new navigation path 1398 is leading the user 1050 to the closest waiting area. In such a case, the controller can generate a new navigation path from the then-current location of the user 1050 in the volume of space 1099 to the lab 1052 when the technician has returned. As another example, if there is some type of emergency (e.g., fire, active shooter) in or near the volume of space 1099, the controller can send communication signals to the user device 1055 so that the user device 1055 communicates the emergency and provides other important instructions aside from following the new navigation path 1398.

Figure 14A:
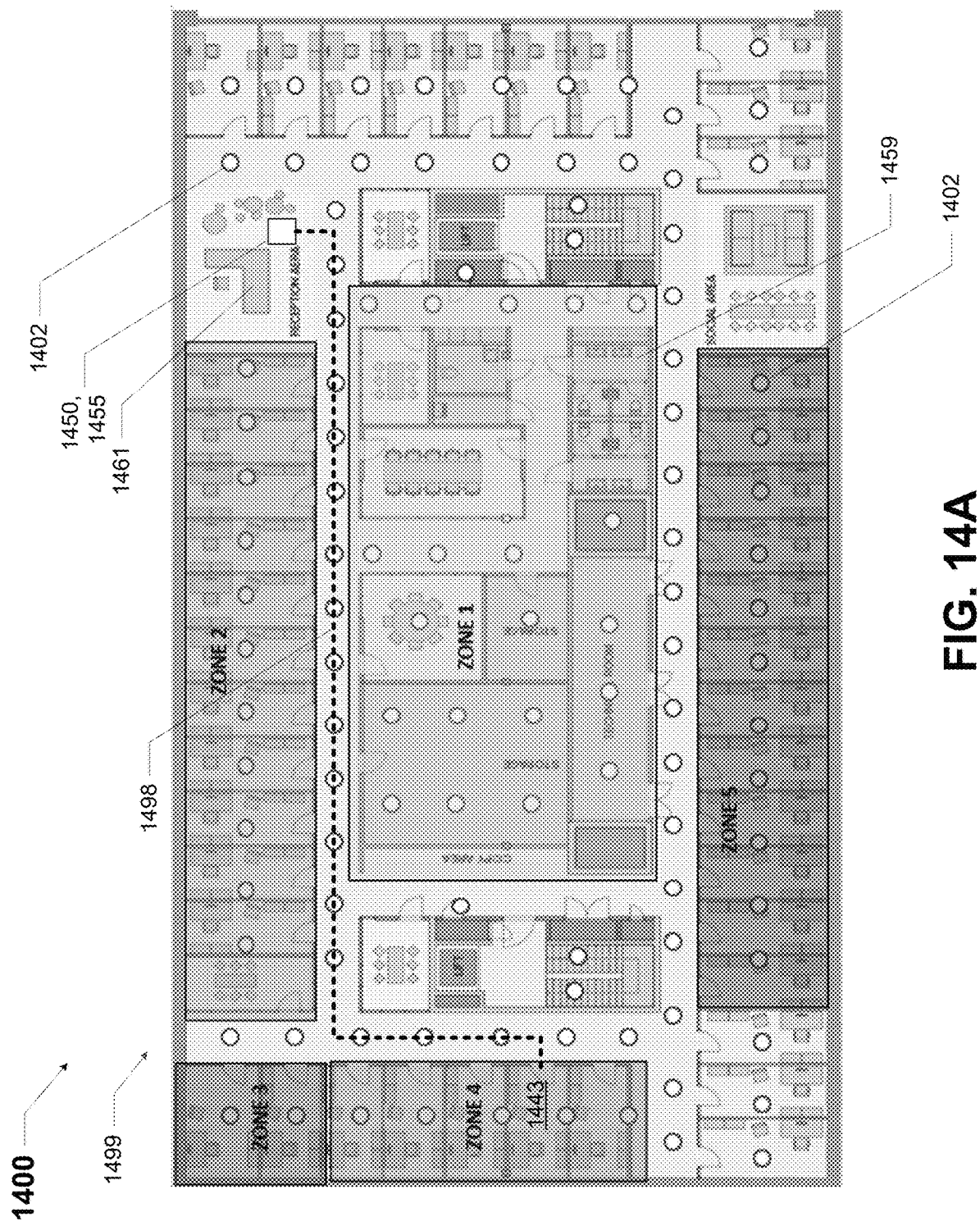
FIGS. 14A through 16B show another example of providing real time navigation services using multiple electrical devices in a volume of space in accordance with certain example embodiments.

FIGS. 14A through 16B show another example of providing real time navigation services using multiple electrical devices 1402 in a volume of space 1499 in accordance with certain example embodiments. Referring to FIGS. 1 through 16B, the system 1400 of FIG. 14A shows a volume of space 1499 in the form of a floor of an office building. FIG. 14B shows a display 1492 of the user device 1455 (shown in FIG. 14A) for an application (also called an app herein) related to a real-time navigation service.

The volume of space 1499 includes a large number (in this case, 44) of offices, a reception area 1461, and breakout rooms located along the outer perimeter of the volume of space 1499. One of those offices (specifically, office 1443) is the destination of the user 1450, who is visiting the office for a meeting. There are also two sets of stairwells and two elevators for accessing one or more floors above and below the floor shown in FIG. 14A. In the middle area of the volume of space 1499 are bathrooms (e.g., bathroom 1459), breakrooms, closets, storage rooms, conference rooms, and back office support rooms. There are also a number of hallways providing access to all of these rooms in the volume of space 1499.

There are also a large number of electrical devices 1402 located in the volume of space 1499. The electrical devices 1402 of FIGS. 14A through 16B are substantially similar to the electrical devices discussed above. Each electrical device 1402 is in direct communication with at least one other electrical device 1402 in the volume of space 1499. In this way, the electrical devices 1402 in the volume of space 1499 are part of a mesh network that allows for complete coverage in the volume of space 1499 to determine the location of the user device 1455 and to provide real-time navigation services to the user 1450 through the user device 1455 while the user device 1455 is on the floor depicting the volume of space 1499.

To better manage the communication for the large number of electrical devices 1402 in the volume of space 1499, multiple zones can be created to form a hierarchy. For example, FIG. 14A shows five different zones that can be established. In addition to helping streamline the flow of communication signals (thereby better managing available bandwidth), such zones can be helpful in providing real-time navigation services. For example, for extremely large and/or densely populated areas, zones can be established to allow for more specific navigation services within a zone once that particular zone is entered into by a user (e.g., user 1450).

Figure 14B:
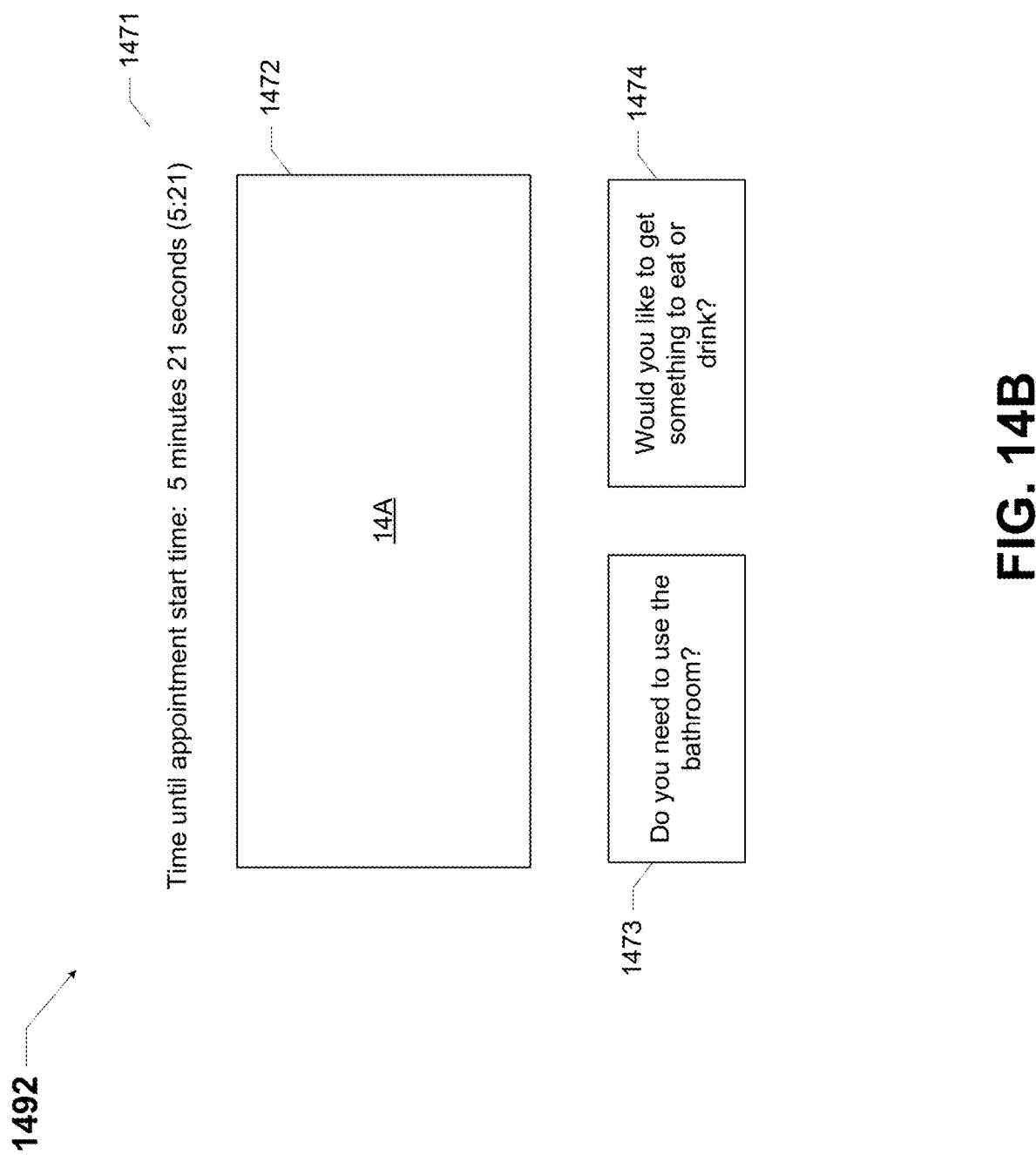

In this example, the user 1450 has a user device 1450 in the form of a cell phone. An app is loaded on the user device 1455 to access the navigation services provided in the volume of space 1499. The user 1450 is checked in with the receptionist at the reception area 1461 before a scheduled meeting. FIG. 14B shows the display 1492 of the user device 1455 when the real-time navigation services app is loaded and active. In this example, the display 1492 shows, going from the top of the display 1492 to the bottom, a field 1471 that displays how much time remains before the meeting starts, a map 1472 showing the floorplan of the volume of space 1499 and the navigation path 1498 (as shown in FIG. 14A), a selection button 1473 of whether the user 1450 wants to use the restroom, and a selection button 1474 of whether the user 1450 wants something to eat or drink before the meeting.

Figure 15:
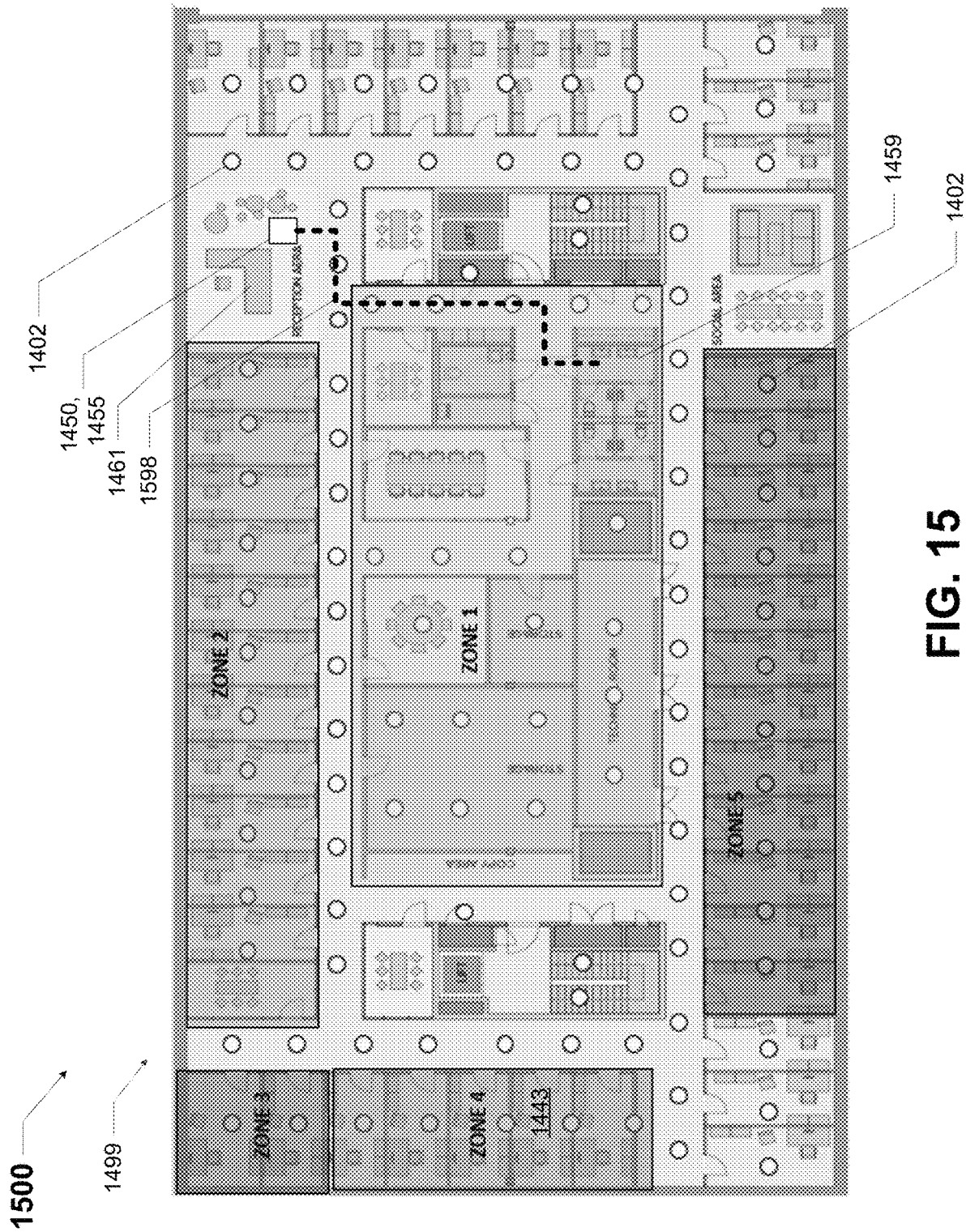

If the user 1450 wants to get to the meeting directly, the user 1450 follows the navigation path 1498 on the display 1492, such as what is shown in FIG. 14A. In this example, the user 1450 wants to use the bathroom 1459 before the meeting begins, and so the user 1450 selects selection button 1473 on the display 1492. When this occurs, the map 1472 on the display 1492 changes to what is shown in FIG. 15, which shows a system 1500 that is identical to the system 1400 of FIG. 14A, except that navigation path 1498 is replaced by navigation path 1598, which has a destination of the bathroom 1459. The user 1450 can reach the bathroom 1459 by following the navigation path 1598 shown as the map 1472 on the display 1492 of the user device 1455.

Figure 16A:
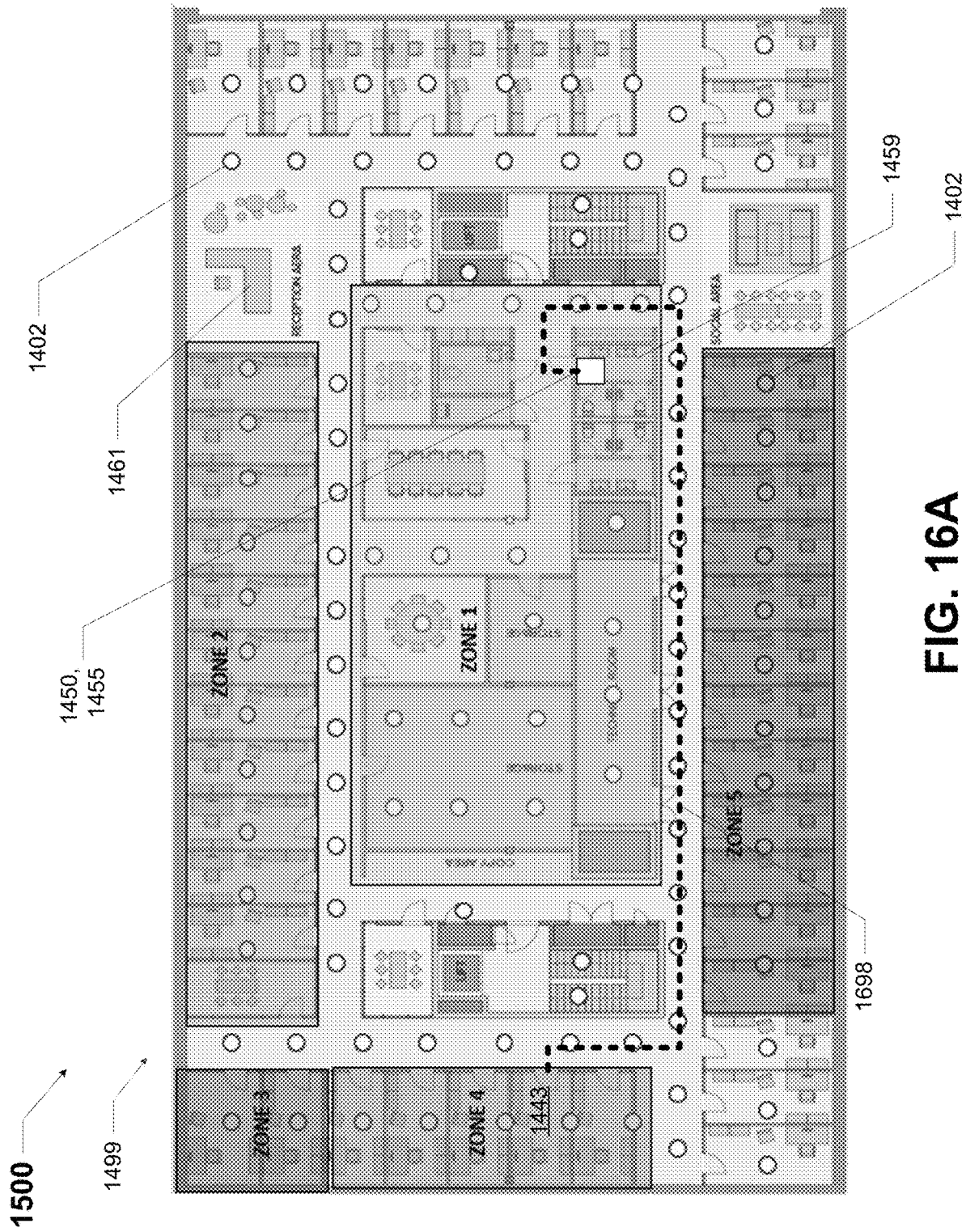

When the user 1450 is done using the bathroom 1459, three minutes and 11 seconds later, the user 1450 looks at the display 1692 on the user device 1455. In this example, the display 1692 shows, going from the top of the display 1692 to the bottom, a field 1671 that displays how much time remains before the meeting starts, a map 1672 showing the floorplan of the volume of space 1499 and the navigation path 1698 (as shown in FIG. 16A), and a selection button 1674 of whether the user 1450 wants something to eat or drink before the meeting. If the user 1450 wants to get to the meeting directly, the user 1450 follows the navigation path 1698 on the display 1692, such as what is shown in FIG. 16A.

The navigation path 1698 uses a different hallway to reach room 1443 (the destination) compared to navigation path 1498 because the start point of the bathroom 1459 is different than the start point of the reception area 1461. The controller that provides the real-time navigation services can execute one or more algorithms 133 (e.g., Andre LaMothe's Algorithms) to determine the most efficient navigation path. The evaluation of the optimal navigation path, as well as potentially alternative navigation paths based on one or more of a number of factors (e.g., shopping, attractions, bathrooms, refreshments, emergencies, traffic), can be continually performed by the controller and communicated to the user 1450 on the user device 1455.

In some cases, a volume of space (e.g., volume of space 1499) can have gaps where a user device (e.g., user device 1455) is unable to communicate with any electrical devices 1402 in real time. For example, perhaps the communication ranges of the electrical devices in proximity to the user device at a particular point in time fail to overlap with the communication range of the user device. As another example, perhaps there is limited bandwidth available at a particular time, and so communication signals transmitted between a user device and one or more electrical devices cannot be received even though there is an overlap of communication ranges of the user device and the electrical devices.

In such a case, the app or other software on the user device can use one or more other modules (e.g., compass, fitness tracker, step counter, gyroscope) on the user device to provide an approximation of progress along a path to a destination until communication between the user device and one or more other electrical devices in the volume of space can be resumed.

Alternatively, there can be cases where a user device is unable to communicate with any of the electrical devices in a volume of space. For example, if a user has landed at an airport in a foreign country, and the user device does not have a SIM card or other access that works outside of the native country of the user, real-time communication with the electrical devices in that volume of space is not possible. In such a case, the user can access the app on the user device before the user enters the volume of space (e.g., the foreign airport), while the user device has internet communication, to download an interactive map of the volume of space. Once that is done, the user can use the app on the user device to navigate within the volume of space by entering answers to a few basic questions (e.g., What gate are you currently at? What gate is your next flight? Are you looking for baggage claim? Do you need to use a bathroom? Are you looking for places to eat? What time is your next flight scheduled to depart?). In this way, while the app on the user device will not be able to provide navigation services with the most up-to-date information, the information available on the app on the user device should be sufficient for the user's purposes in most cases.

Figure 17:
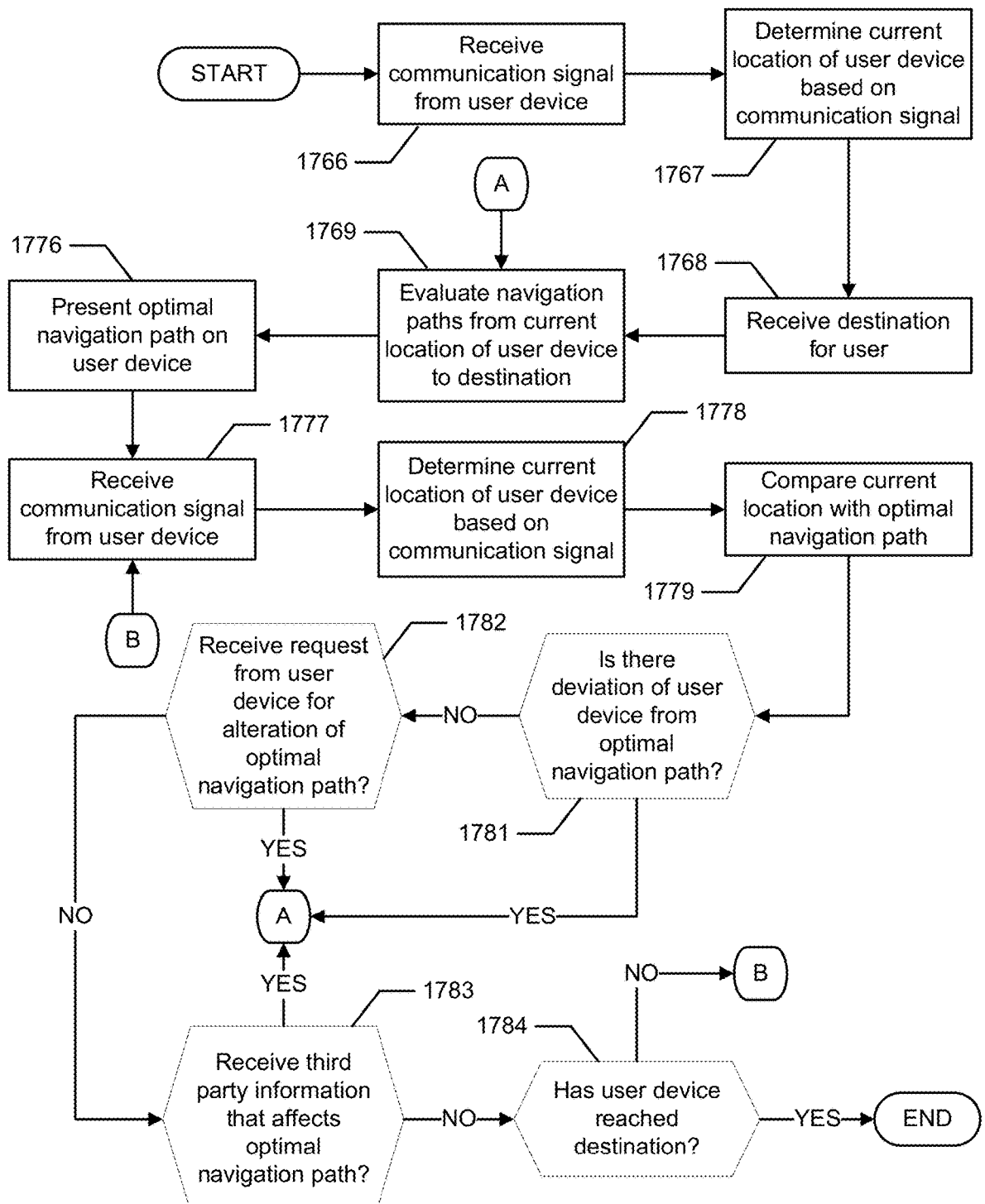
FIG. 17 shows a flowchart of a method for providing real time navigation services in accordance with certain example embodiments.

FIG. 17 shows a flowchart 1770 of an example method for providing real time navigation services using an example system (e.g., system 100) that includes multiple electrical devices (e.g., electrical devices 102). While the various steps in this flowchart 1770 are presented sequentially, one of ordinary skill will appreciate that some or all of the steps may be executed in different orders, may be combined or omitted, and some or all of the steps may be executed in parallel. Further, in one or more of the example embodiments, one or more of the steps shown in this example method may be omitted, repeated, and/or performed in a different order.

In addition, a person of ordinary skill in the art will appreciate that additional steps not shown in FIG. 17 may be included in performing this method. Accordingly, the specific arrangement of steps should not be construed as limiting the scope. Further, a particular computing device, such as the computing device discussed above with respect to FIG. 2, can be used to perform one or more of the steps for the methods shown in FIG. 17 in certain example embodiments. Any of the functions performed below by the controller 104 can involve the use of one or more protocols 132, one or more algorithms 133, and/or stored data 134.

The method shown in FIG. 17 is merely an example that can be performed by using an example system described herein. In other words, systems for providing real time navigation services to one or more user devices in a volume of space can perform other functions using other methods in addition to and/or aside from those shown in FIG. 17. Referring to FIGS. 1 through 17, the method shown in the flowchart 1770 of FIG. 17 begins at the START step and proceeds to step 1766, where a communication signal 195 is received from a user device 155. The communication signal 195 can be directly received by one or more electrical devices 102 and/or sensor devices 165. These electrical devices 102 and/or sensor devices 165 can provide the communication signals 195 or the information contained therein to the control engine 106 of the controller 104. The user device 155 is within a volume of space 199 when the communication signal 195 is sent. Similarly, the electrical devices 102 and/or sensor devices 165 can also be located within the volume of space 199.

The sensor modules 165 and/or electrical devices 102 can receive the communication signal 195 using one or more of these receivers (e.g., part of a transceiver 124). For example, a BLE receiver of the sensor module 165 can be used to receive a communication signal 195 from the user device 155. In such a case, the user device 155 acts like a beacon and can broadcast a single communication signal 195 or multiple communication signals 195. The sensor module 165 can be configured (either directly or in coordination with a controller 104 of an electrical device 102) to determine the RSSI of the communication signal 195 received from the user device 155. The communication signal 195 sent by the user device 155 can include an ID of the user device 155 and/or the associated user 150.

In step 1767, the current location of the user device 155 within the volume of space 199 is determined based on the communication signal 195 received in step 1766. The current location of the user device 155 can be determined by the controller 104 using one or more algorithms 133 and/or one or more protocols 132. For example, the location of the user device 155 can be determined using the RSSI of the communication signal 195, using the AoA of the communication signal 195, using triangulation, and/or using any other method. Depending on the number of electrical devices 102 and/or sensor devices 165 that receive the communication signal 195, the location of the user device 155 can be determined in two dimensions or three dimensions within the volume of space 199.

In step 1768, a destination of the user 150 is received. The destination of the user 150 can be received by the controller 104. The destination of the user 150 can be received from one or more of any number of sources and in any of a number of ways. For example, the user 150 can input (e.g., type, speak) the destination into the app on the user device 155. As another example, the user 150 can scan a code (e.g., a PNR, a QR code) using the user device 155 through the app. In such a case, the code can be sent to a third party (e.g., an airline, a concert organizer, a theater management company) system by the controller 104, and in return the controller 104 can receive particular anf real-time information about the destination of the user 150.

In step 1769, one or more navigation paths are generated and evaluated from the current location of the user 150 to the destination in the volume of space 199. The navigation paths can be generated and evaluated by the controller 104. Each navigation path can be in two dimensions or three dimensions. The generation and/or evaluation of the navigation paths can involve information provided by one or more third party systems. For example, if there is some type of emergency (e.g., active shooter, accident) or other obstacle (e.g., high congestion, construction) within the volume of space 199, the controller 104 can use this third party information when evaluating the navigation paths.

Such information can also be provided by one or more electrical devices 102 in the volume of space 199. For example, if an electrical device 102 is or includes a video camera, then the controller 104 or some other system in communication with the controller 104 can interpret the images captured by the video camera and use this information in evaluating the navigation paths. For instance, if a video camera captures a high volume of traffic by certain gates at an airport (e.g., by multiple planes arriving at multiple adjacent gates at substantially the same time and quick turn-around departures of those planes), the controller 104 can use this information in evaluating navigation paths that go through this part of the airport.

In some cases, the app of the user device 155 can collect information about the user 150 and use this information in evaluating the various navigation paths. For example, if the user 150 is wheelchair-bound, the controller 104 can assign a higher priority to navigation paths that have elevators instead of stairs or escalators. As another example, if the user 150 is on a large medical campus and is transporting several large boxes on a cart, this information can be entered into the app on the user device 155 to help the controller 104 evaluate the various navigation paths. As yet another example, if the user 150 is on a university campus and is traveling by bicycle, this information can be entered into the app on the user device 155 to help the controller 104 evaluate the various navigation paths.

In step 1776, the optimal navigation path is presented to the user 150. The optimal navigation path (e.g., navigation path 1698) can be presented by the controller 104 on the app on the user device 155. In some cases, in addition to the optimal navigation path, one or more alternative navigation paths can be presented to the user 150. In either case, one or more alternative items can be also be presented to the user 150 along with one or more navigation paths. Examples of such other items can include, but are not limited to, time-based items (e.g., an amount of time before an event at the destination occurs, an estimated amount of time before the user 150 arrives at the destination), convenience items (e.g., options to use a bathroom, dining options, sightseeing options, shopping options), and alerts (e.g., congestion areas, elevator out of service).

In step 1777, a communication signal 195 is received from a user device 155. This repeats step 1766 to allow for the continued tracking of the location of the user 150 in the volume of space 199. The communication signal 195 can be directly received by one or more electrical devices 102 and/or sensor devices 165. These electrical devices 102 and/or sensor devices 165 can provide the communication signals 195 or the information contained therein to the control engine 106 of the controller 104. The user device 155 is within a volume of space 199 when the communication signal 195 is sent. Similarly, the electrical devices 102 and/or sensor devices 165 can also be located within the volume of space 199.

The sensor modules 165 and/or electrical devices 102 can receive the communication signal 195 using one or more of these receivers (e.g., part of a transceiver 124). For example, a BLE receiver of the sensor module 165 can be used to receive a communication signal 195 from the user device 155. In such a case, the user device 155 acts like a beacon and can broadcast a single communication signal 195 or multiple communication signals 195. The sensor module 165 can be configured (either directly or in coordination with a controller 104 of an electrical device 102) to determine the RSSI of the communication signal 195 received from the user device 155. The communication signal 195 sent by the user device 155 can include an ID of the user device 155 and/or the associated user 150.

In step 1778, the current location of the user device 155 within the volume of space 199 is determined based on the communication signal 195 received in step 1777. The current location of the user device 155 can be determined by the controller 104 using one or more algorithms 133 and/or one or more protocols 132. For example, the location of the user device 155 can be determined using the RSSI of the communication signal 195, using the AoA of the communication signal 195, using triangulation, and/or using any other method. Depending on the number of electrical devices 102 and/or sensor devices 165 that receive the communication signal 195, the location of the user device 155 can be determined in two dimensions or three dimensions within the volume of space 199.

In step 1779, the current location of the user 150 in the volume of space 199 is compared with the optimal navigation path. This comparison can be made by the controller 104. This comparison can be performed continually, in increments of time (e.g., every 15 seconds), in increments of distance (e.g., every 100 feet along the optimal navigation path), and/or based on some other metric. The comparison can also be presented to the user 150 on the user device 155.

In step 1781, a determination is made as to whether the current location of the user 150 deviates from the optimal navigation path. This determination can be made by the controller 104. The deviation can be based on some threshold value in terms of distance (e.g., 50 feet away from the optimal navigation path), in terms of time (e.g., one minute behind schedule), and/or in terms of some other factor. If the current location of the user 150 deviates from the optimal navigation path, then the process reverts to step 1769, taking into account the deviation. In addition, or in the alternative, if the current location of the user 150 deviates from the optimal navigation path, then the controller 104 can notify the user 150 through the user device 155 that the user 150 is deviating from the optimal navigation path. If the current location of the user 150 does not deviate from the optimal navigation path, then the process proceeds to step 1782.

In step 1782, a determination is made as to whether a request has been received from the user 150 to alter the optimal navigation path. Such a request can be received by the controller 104 from the user device 155 of the user 150. The request can be the selection of an option (e.g., a virtual pushbutton to use the nearest bathroom) on an app on the user device 155, by a statement (e.g., speaking into a microphone of the user device 155 that the user 150 wants to shop at a nearby store before proceeding to the destination) from the user 150, or by an action (e.g., stop at a food vendor) of the user 150.

The alteration of the optimal navigation path can be a stop or deviation along the way to the destination. In addition, or in the alternative, the alteration of the optimal navigation path can be a change in the destination (e.g., room 1602 in a building instead of room 2119 in the building). If there has been a request from the user 150 to alter the optimal navigation path, then the process reverts to step 1769, taking into account the request. If there has not been a request from the user 150 to alter the optimal navigation path, then the process proceeds to step 1783.

In step 1783, a determination is made as to whether third party information that affects the optimal navigation path has been received. Such third party information can be received by the controller 104. Examples of a third party providing such information can include, but are not limited to, an airline company (e.g., to determine a gate at which a flight ticketed to a user 150 is being relocated), an arena management company (e.g., to provide notification that a particular elevator at the arena is out of order), law enforcement (e.g., to provide notification that a terminal at an airport is in lock-down), a local government agency (e.g., to provide notification that certain traffic signals are without power), and a university (e.g., to provide notification that certain doors of a building on campus are locked during certain hours).

Communication between such third parties and the controller 104 can be routine (e.g., the controller 104 continually or periodically checks in the with a third party system to search for notifications or issues associated with a volume of space 199. In addition, or in the alternative, a third party system can automatically send a notification to the controller 104 whenever there is an emergency or unusual development involving a volume of space 199. If third party information has been received that affects the optimal navigation path, then the process reverts to step 1769, taking into account the third party information. If no third party information has been received that affects the optimal navigation path, then the process proceeds to step 1784.

In step 1784, a determination is made as to whether the user 150 has reached the destination. In other words, a determination is made as to whether the user 150 has reached the end of the optimal navigation path. If the user 150 has reached the destination, then the process ends at the END step. If the user 150 has not reached the destination, then the process reverts to step 1777.

In one or more example embodiments, a user device located in a volume of space can be provided real-time navigation services. The real-time navigation services provided by example embodiments can include providing one or more navigation paths to a destination in the volume of space. These navigation paths can be maintained and updated in real time relative to the movement of the user. Example embodiments can also allow for deviations (in time and/or in direction) along the path for provisions such as, for example, bathroom usage, purchase of food and drink, shopping, recreation, and points of interest. Example embodiments can use existing infrastructure (e.g., an integrated lighting system) to facilitate the tracking of a user (through a user device) and the provision of real-time navigation services in a volume of space. Using example embodiments described herein can improve communication, safety, maintenance, costs, and operating efficiency.

Accordingly, many modifications and other embodiments set forth herein will come to mind to one skilled in the art to which example embodiments pertain having the benefit of the teachings presented in the foregoing descriptions and the associated drawings. Therefore, it is to be understood that example embodiments are not to be limited to the specific embodiments disclosed and that modifications and other embodiments are intended to be included within the scope of this application. Although specific terms are employed herein, they are used in a generic and descriptive sense only and not for purposes of limitation.

What is claimed is:

1. A system for providing navigation services to a user in a volume of space, comprising:
a plurality of electrical devices disposed in the volume of space, wherein each electrical device of the plurality of electrical devices comprises a transceiver, wherein the transceiver of a first subset of the plurality of electrical devices receives at a first time at least one first communication signal broadcast by a user device of the user, wherein the at least one first communication signal comprises a first identification of the user and a destination of the user, wherein the first subset of the plurality of electrical devices sends a second communication signal that includes the first identification and the first destination contained within the at least one first communication signal; and
a controller communicably coupled to the plurality of electrical devices, wherein the controller:
receives the second communication signal sent by each of the first subset of the plurality of electrical devices;
determines the location of the user device in the volume of space using the second communication signal;
determines the destination of the user using the second communication signal;
generates at least one navigation path from the location of the user device to the destination in the volume of space;
selects an optimal navigation path from among the at least one navigation path; and
sends the optimal navigation path to the user device.

2. The system of claim 1, wherein the controller is part of one of the plurality of electrical devices.

3. The system of claim 1, wherein the controller is part of a wireless access controller.

4. The system of claim 1, wherein the controller is part of a network manager.

5. The system of claim 1, wherein the plurality of electrical devices comprises a plurality of light fixtures.

6. The system of claim 1, wherein the first communication signal is a radio frequency signal.

7. The system of claim 1, wherein the optimal path is sent to the user device through at least one of the first subset of electrical devices.

8. The system of claim 1, wherein the optimal path is displayed on a navigation services application loaded on the user device.

9. The system of claim 1, wherein the user device broadcasts, at a second time, at least one third communication signal into the volume of space, wherein the at least one third communication signal is received by a second subset of the plurality of electrical devices, wherein the second subset of the plurality of electrical devices sends a fourth communication signal, based on the at least one third communication signal, to the controller, wherein the controller uses the fourth communication signal to determine the location of the user device at the second time.

10. The system of claim 9, wherein the controller further:
determines that the location of the user device at the second time corresponds with the optimal navigation path; and sends an update of the optimal navigation path to the user device, wherein the update shows the position of the user device at the second time.

11. The system of claim 9, wherein the controller further:
determines that the location of the user device at the second time deviates from the optimal navigation path; and
sends an update of the optimal navigation path to the user device, wherein the update shows a different optimal navigation path that is generated and selected based on the position of the user device at the second time relative to the destination.

12. The system of claim 1, wherein, in response to at least one third communication signal broadcast at a second time by the user device, the at least one third communication signal comprising a new destination, the controller:
determines the location of the user device in the volume of space at the second time using the at least one third communication signal;
determines the new destination of the user in the volume of space using the at least one third communication signal;
generates at least one new navigation path from the location of the user device at the second time to the new destination in the volume of space;
selects a new optimal navigation path from among the at least one new navigation path; and
sends the new optimal navigation path to the user device.

13. The system of claim 1, wherein, in response to at least one third communication signal broadcast at a second time by the user device, the at least one third communication signal comprising a stop before reaching the destination, the controller:
determines the location of the user device in the volume of space at the second time using the at least one third communication signal;
evaluates the stop of the user in the volume of space relative to the optimal navigation path;
generates an updated optimal navigation path based on the stop; and
sends the updated optimal navigation path to the user device.

14. The system of claim 1, wherein, in response to at least one third communication signal broadcast at a second time by the user device, the at least one third communication signal comprising a stop before reaching the destination, the controller:
determines the location of the user device in the volume of space at the second time using the at least one third communication signal;
evaluates the stop of the user in the volume of space relative to the optimal navigation path;
generates a new optimal navigation path based on the stop; and
sends the new optimal navigation path to the user device.

15. The system of claim 1, wherein the optimal navigation path includes an estimated amount of time to reach the destination.

16. The system of claim 15, wherein the at least one first communication further comprises special circumstances of the user, wherein the estimated amount of time to reach the destination accounts for the special circumstances.

17. The system of claim 1, wherein the controller further:
receives at least one third communication signal from a third-party system, wherein the at least one third communication signal comprises information about an obstacle in the optimal navigation path;
determines the location of user device in the volume of space at a second time using the at least one fourth communication signal;
generates at least one new navigation path from the location of the user device at the second time based on the information in the at least one third communication signal;
selects a new optimal navigation path from among the at least one new navigation path; and
sends the new optimal navigation path to the user device.

18. The system of claim 1, wherein the controller further sends possible stops to the user device along with the optimal navigation path.

19. The system of claim 1, wherein the at least one first communication signal is transmitted using Bluetooth Low Energy, and wherein the second communication signal is transmitted using Zigbee.

20. The system of claim 1, wherein the at least one first communication signal is sent using a navigation services application loaded on the user device.

* * * * *